US012737773B2

(12) United States Patent
Fox et al.

(10) Patent No.: US 12,737,773 B2
(45) Date of Patent: Sep. 15, 2026

(54) SYSTEMS AND METHODS FOR DIGITAL MEASUREMENT, REPORTING, AND VERIFICATION (dMRV) LINKED TO CREDIT SECURITIZATION

(71) Applicant: EarthXCG GmbH, Schaffhausen (CH)

(72) Inventors: Michael Robert Fox, Schaffhausen (CH); Peter Hurrell, Killwangen (CH)

(73) Assignee: EarthXCG GmbH, Schaffhausen (CH)

( * ) Notice: Subject to any disclaimer, the term of this patent is extended or adjusted under 35 U.S.C. 154(b) by 6 days.

(21) Appl. No.: 18/591,009

(22) Filed: Feb. 29, 2024

(65) Prior Publication Data

US 2024/0296463 A1 Sep. 5, 2024

Related U.S. Application Data

(60) Provisional application No. 63/449,069, filed on Mar. 1, 2023.

(51) Int. Cl.
*G06Q 30/018* (2023.01)
*G06F 30/20* (2020.01)
*G06Q 40/04* (2012.01)

(52) U.S. Cl.
CPC .......... *G06Q 30/018* (2013.01); *G06F 30/20* (2020.01); *G06Q 40/049* (2025.08)

(58) Field of Classification Search
CPC ....... G06Q 30/018; G06Q 30/40; G06Q 50/06
See application file for complete search history.

(56) References Cited

U.S. PATENT DOCUMENTS

2020/0027096 A1* 1/2020 Cooner .................. G06Q 40/04
2020/0410590 A1* 12/2020 Regmi .................. G06Q 40/08
(Continued)

FOREIGN PATENT DOCUMENTS

WO WO-2023049232 A1 * 3/2023 ............ G06Q 40/10

OTHER PUBLICATIONS

Asgari, A green performance bond framework for managing greenhouse gas emissions during construction: proof of concept using agent-based modeling, 2020 Winter Simulation Conference (WSC), IEEE, 2020 (Year: 2020).*

Woo, et al., Applying blockchain technology for building energy performance measurement, reporting, and verification (MRV) and the carbon credit market: A review of the literature, Building and Environment, vol. 205, 2021, 108199 (Year: 2021).*

(Continued)

*Primary Examiner* — Daniel Vetter
(74) *Attorney, Agent, or Firm* — Gearhart Law LLC

(57) ABSTRACT

A data platform connecting the functions of digital measurement, reporting, and verification (dMRV) of emissions mitigation activities and securitization of emissions credits from the verified emissions mitigation activity data. The dMRV systems and methods are configured for: direct connectivity to onsite sensor and measurement devices at a project location; continuous monitoring, measurement, verification, and reporting of emissions mitigation activity process steps; fraud detection engine for emissions mitigation activity data; emissions mitigation impact engine for emissions mitigation activity processes; rating engine for surety determination of emissions mitigation analysis; extensible immutable data records to capture all project lifecycle impact; open and auditable data records of all emissions mitigation project activities and attributes; compliance reporting with integration to regulatory systems and ERP systems; minting of emissions credits from verified data records; registry data integration for emissions credits; trading exchange integration for credits; OTC trading platform for credits; a marketplace for related third-party services.

16 Claims, 9 Drawing Sheets

(56) References Cited

U.S. PATENT DOCUMENTS

| | | | | |
|---|---|---|---|---|
| 2023/0139137 | A1* | 5/2023 | Slack | G06Q 40/04 705/37 |
| 2023/0274244 | A1* | 8/2023 | Quigley | G06Q 40/04 705/65 |
| 2023/0289820 | A1* | 9/2023 | Boardman | G06Q 40/04 |
| 2024/0095758 | A1* | 3/2024 | Ali | G06Q 40/04 |
| 2024/0119464 | A1* | 4/2024 | Dekker | G06Q 40/04 |
| 2024/0193684 | A1* | 6/2024 | Bai | G06Q 40/04 |
| 2024/0273557 | A1* | 8/2024 | Salako | G06Q 30/018 |
| 2025/0086710 | A1* | 3/2025 | Bai | G06Q 40/04 |

OTHER PUBLICATIONS

Woo, et al., A new blockchain digital MRV (measurement, reporting, and verification) architecture for existing building energy performance, 2020 2nd Conference on Blockchain Research & Applications for Innovative Networks and Services (Brains). IEEE, 2020 (Year: 2020).*

Nolens, et al., BIS Innovation Hub, Smart Contract-based Carbon Credits attached to Green Bonds, Project Genesis 2.0, Hong Kong Monetary Authority, pp. 81, Oct. 2022.

Autenrieth, et al., European Bank for Reconstruction and Development (EBRD) and Ministry for the Ecological Transition (MITECO), Protocol for Digitalised Monitoring, Reporting and Verification (D-MRV Protocol), Version 1.0, Dec. 2020.

Thompson, et al., Global Blockchain Business Council, Digital Measurement Reporting & Verification (dMRV) Framework, Version 2, 2021, pp. 33.

Wainstein, et al., open climate, Leveraging blockchain for a global, transparent and integrated climate accounting system, pp. 23.

World Bank, Operational Guidelines, Cats (Carbon Assets Tracking System), KP Emission Reduction Transaction Registry (P172241), V.11.0. Mar. 2024, pp. 353.

Biernacki, et al., Climate Action Data Trust to unify carbon credit registry data, Singapore (Oct. 26, 2022), pp. 2.

Digital MRV Framework, Digital Measurement, Reporting Verification Framework, 2021, pp. 14.

* cited by examiner

100
Project Registration
102
Project Development
104
Project Validation
106
Project Measurement, Reporting, and Verification
112
Project Connect
110
Project Setup
108
Exchange Transacting
118
Registry Interchange
116
Minting
114
Registration Management
120
dMRV Management
122
Securitization Management
124
Data Platform
126

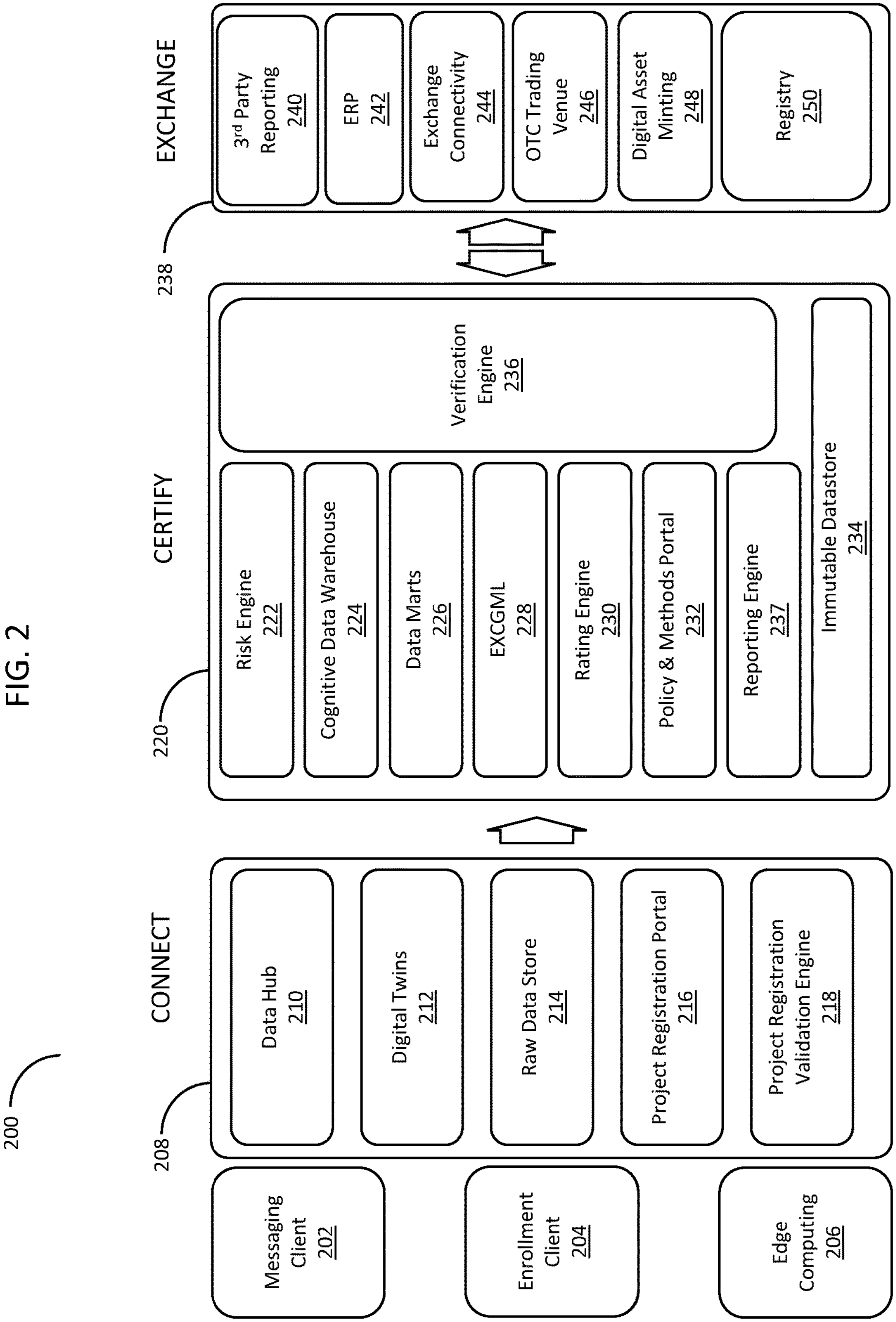
FIG. 2
200
Messaging Client 202
Enrollment Client 204
Edge Computing 206
208
CONNECT
Data Hub 210
Digital Twins 212
Raw Data Store 214
Project Registration Portal 216
Project Registration Validation Engine 218
220
CERTIFY
Risk Engine 222
Cognitive Data Warehouse 224
Data Marts 226
EXCGML 228
Rating Engine 230
Policy & Methods Portal 232
Reporting Engine 237
Immutable Datastore 234
Verification Engine 236
238
EXCHANGE
3rd Party Reporting 240
ERP 242
Exchange Connectivity 244
OTC Trading Venue 246
Digital Asset Minting 248
Registry 250

Figure 4:
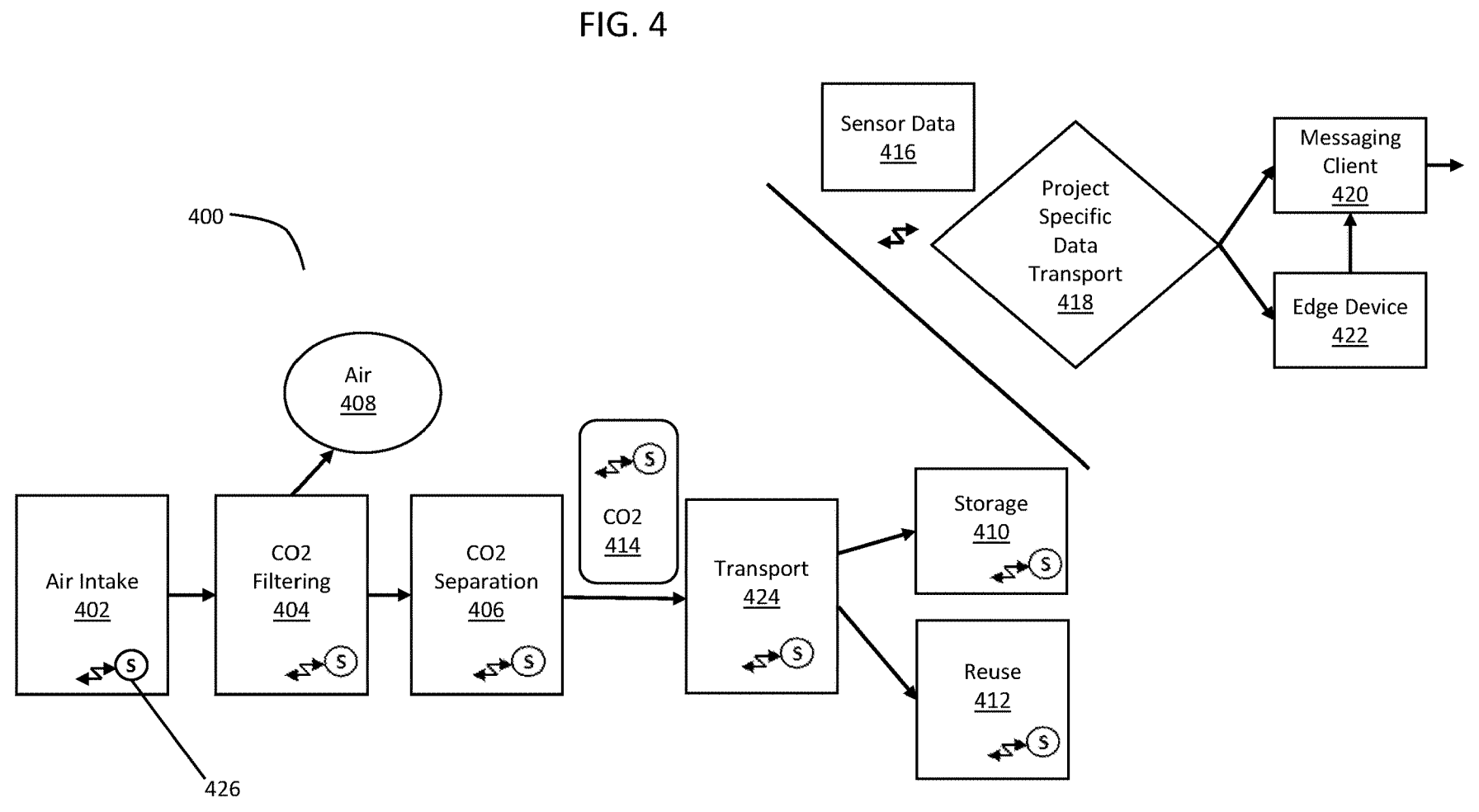

Air Intake 402

CO2 Filtering 404

Air 408

CO2 Separation 406

CO2 414

Transport 424

Storage 410

Reuse 412

426

Sensor Data 416

Project Specific Data Transport 418

Messaging Client 420

Edge Device 422

Figure 7:
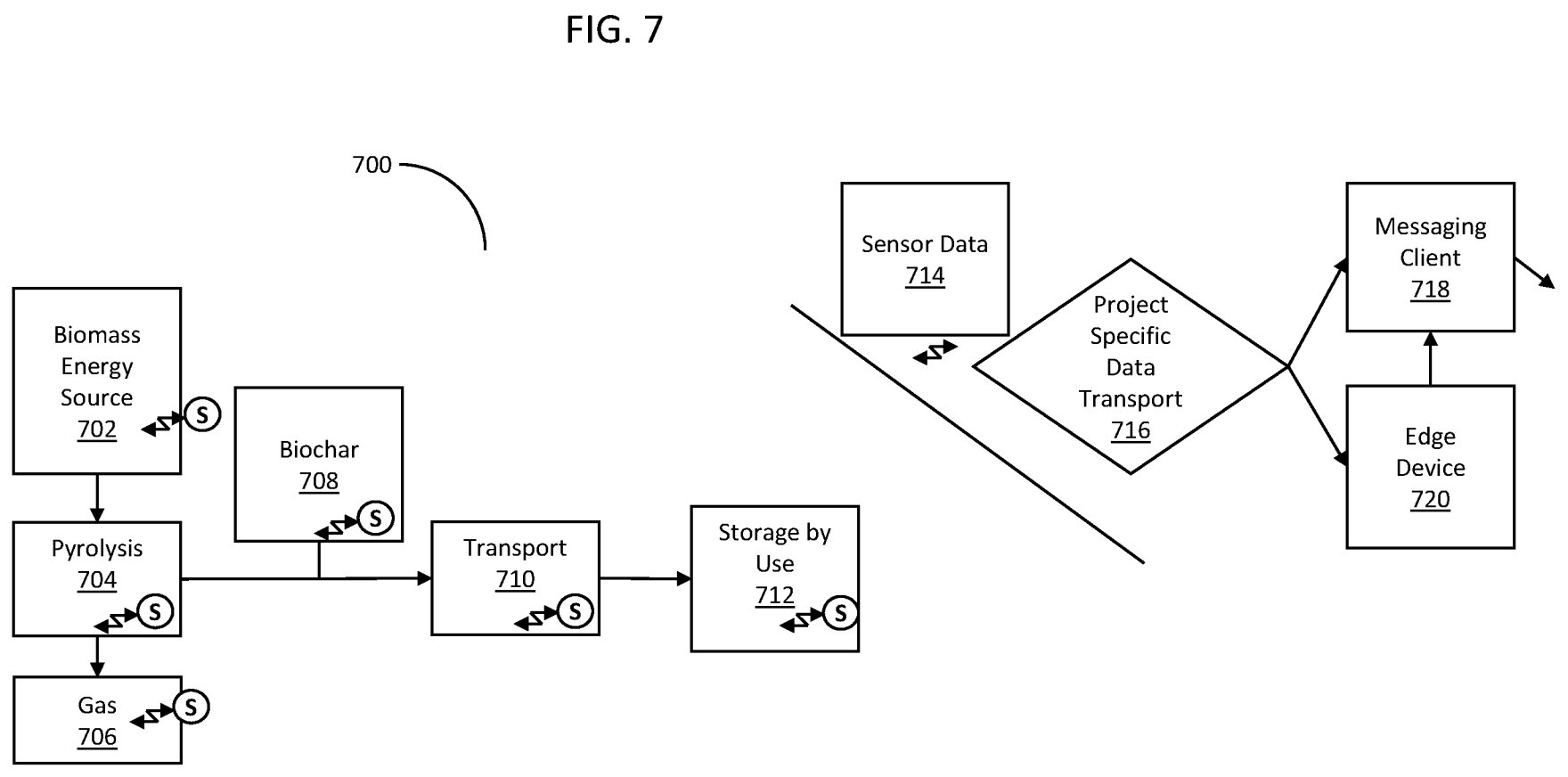

Biomass Energy Source 702

Pyrolysis 704

Gas 706

Biochar 708

Transport 710

Storage by Use 712

Sensor Data 714

Project Specific Data Transport 716

Messaging Client 718

Edge Device 720

S

800
Water Intake 802
S
CO2 Filtering, Separation, or Stripping 804
S
Sea Water 806
CO2 808
S
Transport 810
S
Storage 812
S
Reuse 814
S
Sensor Data 816
Project Specific Data Transport 818
Messaging Client 820
Edge Device 822

900
Satellite Based Sensor
902
Aerial Based Sensor
904
Robotic Based Sensor
906
Field Based Sensor
910
S
S
S
S
Nature Based Emissions Mitigation System, e.g., Afforestation
912
Sensor Data
914
Project Specific Data Transport
916
Messaging Client
918
Edge Device
920

SYSTEMS AND METHODS FOR DIGITAL MEASUREMENT, REPORTING, AND VERIFICATION (dMRV) LINKED TO CREDIT SECURITIZATION

CROSS-REFERENCE TO RELATED APPLICATIONS

The present application claims priority under 35 USC 119(e) from U.S. Provisional Application No. 63/449,069 filed on Mar. 1, 2023, the entire contents of which are incorporated by reference.

FIELD OF THE INVENTION

The field of the invention and its embodiments relate to systems and methods for digital measurement, reporting, and verification (dMRV) for emissions mitigation activities, and the securitization of the verified emissions mitigation activity data into assets. It is within the scope of this invention for emissions to include, but not be limited to, all types of pollution. It is within the scope of this invention for the environment to include, but not limited to, all ecosystems and/or all ecospheres on the planet including, but not limited to, the lithosphere, cryosphere, hydrosphere, and/or atmosphere.

BACKGROUND OF THE INVENTION

The earth is undergoing a climate crisis that poses an existential threat to humanity and other life on the planet. Rising temperatures of the air and seas are increasingly disrupting weather patterns, ocean temperatures, sea levels, and agriculture, among many more derivative maladies. Climate change increasingly puts lives, livelihoods, and social order at significant risk. A powerful economic model exists that can impose costs of pollution on the polluters and thus incentivize them to reduce or eliminate their emissions. Where emissions cannot be reduced or eliminated, polluters have the ability to buy emissions credits which are produced by projects that remove emissions from the environment. A type of emissions credits are carbon credits which address the issue of polluting carbon dioxide (CO2) emissions. While the markets for emissions credits exist, there is a key failing that prevents the potential benefits from being realized, the lack of integrity of emissions credit claims. Emissions credits are only as valuable as the truth behind them. Unfortunately, today there is an inordinate amount of overestimation, misrepresentation, and fraud at every stage in the emissions crediting process. Today, projects claiming to mitigate emissions, the intermediaries that allocate emissions credits to projects, and the markets that sell emissions credits rely almost entirely on human subjective assessment and human decision making at every step. The inherent subjectivity is prone to error and abuse. The result is an increase emissions credit business activity but very limited impact on climate change since the credits sold that purport to represent emissions mitigation results are not accurately representing the actual environmental impact.

The present invention solves the most significant problem in emissions credit markets, which is credit integrity. Integrity means that buyers of credits can have confidence that the credits reflect actual emissions mitigation results. Credit integrity allows for credit markets to function correctly as integrity means that market participants can rely on truthfulness of the claims of emissions mitigation results, for example carbon dioxide removal (CDR).

Emissions credits, and specifically carbon credits, are used as an economic incentive to place the cost of emissions pollution on the polluters. Those that pollute need to either reduce their pollution and/or pay for their pollution by buying carbon credits. The cost of carbon credits incentivizes polluters to invest in reducing their carbon footprint while simultaneously funding the projects that remove, reduce, and/or avoid emissions. The problem is that many carbon credits are created from environmental projects that either do not remove CO2 as purported, and/or do not actually avoid the production of additional CO2, and/or simply overestimate and misrepresent the level of impact, or no longer exist, or never actually existed, or have their credits double or triple counted by market participants. The effect of which is that the impact of emissions mitigation activities is wildly overstated and thus society is misled and will continue to suffer the effects of climate change.

Today, many of the CDR projects are required by standards bodies to perform measurement, reporting, and verification (MRV) of their emission mitigation activities as a prerequisite for claiming credits. However, there are significant deficiencies in the current MRV methodologies. The current methods for performing MRV are largely manual and dependent on human assessment involving estimation. Most of the current work to digitalize MRV (dMRV) aim to digitalize document workflows between human stakeholders. The present invention, however, is an end-to-end, data driven digital process that eliminates the subjective assessments of human stakeholders from the MRV process and incorporates the innovative use of advanced data analytics.

It would be more desirable and beneficial to society to be able to transparently manage emissions mitigation activities and have the resulting credits be of high integrity. It would accelerate investment in emissions mitigation projects because buyers of credits would trust that their purchases are contributing to the reduction of greenhouse gases in the environment. It further accelerates investment in emissions mitigation projects by enabling financial markets to trade emissions credits as trustworthy assets. The present invention brings integrity to the CO2 removal and carbon credit industry with a technical solution for eliminating subjectivity in the verification process and removing doubt about the actual environmental impact of emissions mitigation activities. The present invention solves the problem by teaching a data platform that enables and connects dMRV and emissions credit securitization to produce high-integrity environmental credits at scale.

REVIEW OF RELATED ART

Publication, "Digital Monitoring, Reporting, and Verification Systems and Their Application in Future Carbon Markets", World Bank, (link https://documents1.worldbank.org/curated/en/099605006272210909/pdf/IDU0ca02ce8009a2404bb70bb6d0233b54ffad5e.pdf)—This reference describes the advantages of digital monitoring, reporting, and verification based on smart meters and sensors.

Publication, "Digital MRV Framework", Interwork Alliance, (link https://interwork.org/wp-content/uploads/2021/11/Digital-MRV-Framework-1.0.pdf)—This reference describes a data and process standard for packaging evidence in verifiable claims from MRV solutions.

CN114994264A—This reference describes a digital monitoring platform based on a blockchain enterprise-level ledger with a server connected to a carbon emission monitoring module.

KR102331039B1—This reference describes systems and methods for blockchain-based zero-carbon credits transactions. In particular, this technology is configured to trade credits on greenhouse gas reductions and renewable energy generation/production.

US20220366021A1—This reference describes the verification of a digital asset to determine ownership, provenance, and lineage. Blockchain forensic analysis includes triangulation of electronic devices involved in blockchain transactions relating to the digital assistant.

U.S. Ser. No. 11/774,255—This reference teaches methods and systems configured to enable the generation of tradable environmental attributes, such as carbon offsets, through the physical movements of users. This solution integrates a modal shift optimization application that operates on a user's device.

WO2020198409A1—This reference teaches secure token-based exchange of pollution credits for the reduction of worldwide pollution. A computing device may receive carbon emissions acquisition data indicative of an allowance of carbon emissions. Token data is generated using the computing device and is associated with a portion of the allowance of carbon emissions. A distributed transaction ledger retains stored token data.

Unicsoft—This reference describes a digital asset trading platform configured for tokenized emissions credits to be exchanged between market participants. This platform uses distributed ledger technology to facilitate NFT smart contracts.

Radicle—This reference describes a mobile app for the purpose of evaluating an entity's emissions such as a carbon footprint and for managing the collection and use of emissions data.

SUMMARY OF THE INVENTION

In accordance with the principles of the present invention, the present invention solves the most significant problem facing the emissions credits market, which is integrity of emissions credits. In particular, the invention pertains to a data platform connecting the functions of: digital measurement, reporting, and verification (dMRV) of emissions mitigation activities pertaining to the environment and securitization, which is the creation of emissions credits representing the verified results of emissions mitigation activities. The invention pertains to a data platform that is able to fully automate the dMRV process and provide advanced levels of verification by utilizing multi-layered verification analytics.

The invention solves a variety of issues for emissions mitigation projects. The first issue is the integrity of the emissions credits. This pertains to market trust and regulatory compliance. A method and system are described for facilitating transparency of independent auditable reporting and immutable data records to ensure ongoing compliance with emissions regulations and industry standards for validating, measuring, monitoring, recording, verifying, and reporting of emissions mitigation activities. The second issue solved pertains to operations optimization and scalability. Both a method and system are described that enable low-touch, end-to-end, data driven processes that integrate with existing assets and enables automation of data collection; secures data connectivity; provides optimization analytics to reduce costs; improves effectiveness through calibration of components, materials, and industrial processes; collects data in an ongoing and continuous manner; and analyzes data in an ongoing and continuous manner. The third issue solved is the trustworthy monetization of the results of emissions mitigation activities. A method and system are described that enables high-integrity emissions credit production from verified emissions mitigation activity data to support the healthy functioning of emissions credit markets and business cases for investments in emissions mitigation projects.

In some aspects, the techniques described herein relate to a system, including: a data platform configured to enable and connect dMRV and carbon credit securitization to produce high-integrity environmental credits. The data platform may have a connect module including: a secure application programming interface (API); a data hub; digital twins; and a raw data store.

The data platform may have a certification module including: a cognitive data warehouse; a risk engine; a verification engine; a rating engine; and an immutable datastore. The data platform may have an exchange module including: digital asset minting; digital asset custodial services; and digital asset transaction services, and third-party financial systems data interchange.

In some aspects, the techniques described herein relate to a system, including: a data platform configured to enable and connect dMRV and emissions securitization to produce high-integrity environmental credits. In some implementations, the data platform has a connect module including: a secure application programming interface (API), wherein the API is configured to transmit data securely between at least one source of data and a data hub; the data hub is configured to collect data related to the monitoring of at least one physical asset for emissions mitigation verification; a sensor, the at least one sensor is configured to detect or measure attributes of the at least one physical asset for analysis in emissions mitigation verification; a raw data store, the raw data store is configured to store raw data from at least one source; digital twins, the digital twins are configured to simulate at least one emissions mitigation project.

In implementations, the data platform may have a certification module including: a risk engine, where the risk engine may be configured to identify at least one anomaly; a cognitive data warehouse, where the cognitive data warehouse is configured to convert the raw data from the raw data store into a logical schema having at least a portion of operating performance data; a verification engine, where the verification engine is configured to determine the emissions mitigation impact of emissions mitigation activities; a rating engine, the rating engine configured to determine the surety of the emissions mitigation activity analysis: an immutable datastore, the immutable datastore is configured to append a ledger table, where the ledger table has georedundancy and automated digest management.

In further implementations, the data platform may have an exchange module including: a digital asset minting element, where the digital asset minting element is configured to produce a digital asset, such as but not limited to a non-fungible token; a digital asset custodial services element, where the digital asset custodial services element processes and maintains data associated with the custodianship of at least one digital asset; a digital asset transaction services element, where the digital asset transaction services element processes transactions associated with at least one digital asset; an exchange connectivity element, where the exchange connectivity element is configured to exchange data with third-party systems.

In some aspects, the techniques described herein relate to a system further including a verification analytics engine configured to provide reports, dashboards, visualizations, insights, decision support, and to trigger automated processes.

In some aspects, the techniques described herein relate to a system further including a data package processing engine.

In some aspects, the techniques described herein relate to a system further including a project registration and management portal.

In some aspects, the techniques described herein relate to a system further including a project management application.

In some aspects, the techniques described herein relate to a system further including a project registration validation engine.

In some aspects, the techniques described herein relate to a system further including project validation tools.

In some aspects, the techniques described herein relate to a system further including third-party data sources for analytics.

In some aspects, the techniques described herein relate to a system further including a policy and methods portal. In some aspects, the techniques described herein relate to a system further including policy and methods tools.

In some aspects, the techniques described herein relate to a system further including a connectivity element for an accounting system, a carbon accounting system, and/or an ERP system.

In some aspects, the techniques described herein relate to a system further including a third-party reporting element.

In some aspects, the techniques described herein relate to a system further including a marketplace for related third-party services.

In some aspects, the techniques described herein relate to a computer-implemented method including: transmitting data, using a configured secure application programming interface (API), for transmitting data securely between at least one source of data related to a physical asset and a data hub; monitoring the at least one physical asset, using a data hub, for emission mitigation activity verification; measuring, using at least one sensor or device in communication with a data platform, the at least one physical asset for operating data; storing raw data, using a configured data store, for storing raw data from at least one data source for analysis; modelling emissions mitigation activities, using configured digital twins, for simulating at least one emissions mitigation project; converting raw data into a logical schema, using a configured cognitive data warehouse, for converting at least a portion of the emissions mitigation activity data; analyzing data, using a configured risk engine, for identifying at least one anomaly; determining the emissions mitigation activity impact, using a configured verification engine, for verifying impact of at least one emissions mitigation activity; determining the surety of the analysis of the emissions mitigation activity, using a configured rating engine, for the determination of rating the surety of the emissions mitigation activity analysis; storing data from the emissions mitigation impact analysis, using an immutable datastore configured to append a ledger table, for storing emissions mitigation impact analysis data; exchanging data from the emissions mitigation impact analysis, using a configured exchange connectivity element, for exchanging data with third-party systems; digital asset minting, using a configured digital asset minting element, for producing at least one digital asset representing the verified emissions mitigation impact of an emissions mitigation activity; maintaining custodial data of the digital asset associated with the emissions mitigation activity, using a digital asset custodial services element, for processing and maintaining data associated with the custodianship of the at least one digital asset; processing transactions of the at least one digital asset, using a digital asset transaction services element, for transacting the at least one digital asset.

In some aspects, the techniques described herein relate to a method wherein the analysis of the emissions mitigation impact by the data platform triggers the generation of at least one data record;

In some aspects, the techniques described herein relate to a method wherein the at least one data record generated by the data platform is recorded in a project data record;

In some aspects, the techniques described herein relate to a method wherein the analysis of the emissions mitigation impact by the data platform triggers the generation of at least one data report;

In some aspects, the techniques described herein relate to a method wherein the risk engine detects at least one anomaly and outputs a result indicating the operating data as fraudulent;

In some aspects, the techniques described herein relate to a method wherein the emissions mitigation verification engine identifies at least one verified emissions removal unit from the operating data.

In some aspects, the techniques described herein relate to a method wherein the at least one verified emissions removal unit is minted into the at least one digital emissions credit asset.

In some aspects, the techniques described herein relate to a method wherein the at least one digital emissions credit asset is digitally associated with its data record.

In some aspects, the techniques described herein relate to a method wherein the operating data is encrypted.

In some aspects, the techniques described herein relate to a method further including immutably recording, using the data platform, the at least one digital emissions credit.

The technical solution of the dMRV systems and methods is configured for: securely transmitting data using an API; monitoring physical assets for emission mitigation activity; measuring with devices and sensors; storing data for analysis; modelling emissions mitigation activities with digital twins; analyzing raw data with a risk engine to identify anomalies; converting raw data into a logical schema with a cognitive data warehouse; determining the emissions mitigation activity impact with a verification engine; determining the surety of the analysis with a rating engine; storing data from the analysis with an extensible immutable ledger table; exchanging analysis data with third-party systems; minting a digital asset representing the verified emissions mitigation impact; maintaining custodial data of the digital asset; and processing digital asset transactions.

In some aspects, the techniques described herein relate to a method further including the measurement, reporting, and verification of emissions activities, including but not limited to scope 1, scope 2, and/or scope 3 emissions related to emissions mitigation project activities.

In some aspects, the techniques described herein relate to a method further including compliance reporting with data integration to regulatory systems and/or ERP systems.

In some aspects, the techniques described herein relate to a method further including data integration to third-party registries and/or certification bodies.

In some aspects, the techniques described herein relate to a method further including data integration to trading exchanges.

The data platform has privacy features such as encryption, zero trust, and/or quantum resistance. The technical solution of the dMRV systems and methods is also configured for: secure indirect connectivity to onsite devices and sensors at a project facility. It is within the scope of this invention for indirect connectivity to be accomplished via edge computing, and other integration options with ratings adjusted based on the type of integration as per the ratings examples in the documentation.

The present invention's dMRV capabilities are relevant for engineered and nature-based emissions mitigation systems. There are many such types of systems and variations in the designs of each system. For example, a non-exhaustive list of engineered systems includes Direct Air Capture (DAC), Direct Sea Capture, Carbon Capture and Storage (CCS), Bioenergy CCS (BECCS), and BECCS with Combined Heat and Power (BECCS+CHP). Examples of nature-based systems biochar, afforestation, mineralization, enhanced weathering, ocean alkalinity enhancement, and macroalgae. Measurement methodologies of the present invention all rely on the use of including, but not limited to instruments, devices, and/or sensors for remote measurement of emissions mitigation systems and subsystems.

Sensors may utilize a variety of technologies independently and/or in combination as might be most relevant to a particular emissions mitigation system. Sensors are used to measure, by example, but not limited to, systems operations, environmental conditions in which systems operate, systems inputs such as, biowaste energy, a catalyst, a compound, and/or a molecule, and/or a systems output including, but not limited to, emissions captured, energy, and/or a byproduct. It is within the scope of this invention for a byproduct to be in the form of including, but not limited to, a gas, a liquid, and/or a solid such as biochar. Sensor technologies employed may include, but are not limited to, LIDAR, Photogrammetry, Radar, and the autonomous operation of remote platform beyond visual line-of-sight (BVLOS), Terrestrial Laser Scanning (TLS, or terrestrial LiDAR), which may under circumstances of imperfect observability be combined with separation algorithms to accurately estimate what cannot be directly measured, LiDAR, satellite imagery, Synthetic Aperture Radar (SAR), environmental sensors such as temperature and air pressure, gas sensors, biomass sensors, and/or biochar sensors.

Re-use of existing sensors in industrial processes: e.g., Temperature, flow rates, CO2 concentration sensors that already exist and are measuring steps in the process for operations purposes independently. We are repurposing these collections of sensors specifically for dMRV which is not currently done in any embodiment. In addition, we can envisage new sensors for automating currently manual field processes such as soil sampling and chemical analysis where currently samples are sent to labs. Drone technology and radar technology such as synthetic aperture radar can also be deployed in the future to automate surveying and site visits currently performed by human teams. It is within the scope of this invention for a sensor to include, but not be limited to, a level sensors, a leak sensor, a humidity sensor, a gas and/or a chemical sensor, a force sensor, a flow sensor, a flaw sensor, a flame sensor, an electrical sensor, a contact sensor, a non-contact sensor, a vision and/or an imaging sensor, a temperature sensor, a radiation sensor, a proximity sensor, a pressure sensor, a position sensor, a photoelectric sensor, a particle sensor, a motion sensor, and/or a metal sensor.

The platform capabilities may be applied across a variety use cases in a plethora of industries to prove such things as, but not limited to, chain of custody, provenance, quantities, composition, compliance, and/or impact on the environment.

The platform capabilities may be applied across a variety use cases in a plethora of industries such as, but not limited to, water management, waste management, recycling, resource extraction, power generation, power transmission, automated self-driving vehicles, pharmaceuticals, dietary supplements, food and beverage, agriculture, livestock management, mining, logistics, supply chain, materials manufacturing, transportation and logistics, import and export management, building and facility operations, health and safety compliance, biodiversity management, alternative energy grids, microgrid emissions mitigation systems, pollution mitigation systems, and/or intellectual property use in artificial intelligence systems.

The platform functionality may be extended to enable proving such things as, but not limited to, provenance, quantities, composition, compliance, ownership, and/or impact on environment, individuals, entities, and/or legal rights.

Extended Functionality of Platform

Emissions Generation Systems: Connecting to sensors in, and processing data collected from emissions generating systems across industrial, commercial, governmental, and individual processes and activities to provide dMRV services.

Industrial process automation may include control functionality of the connected emissions mitigation activity system and sub-systems to enable remote management of the mitigation activity system. Hybrid Data Collection Services are implemented using mobile applications leveraging any combination of, the measurement and recording capabilities in a mobile device, mobile application software, and field sensors either mobile or fixed, under the operation of a human being, connecting back to the platform that is the subject matter of the invention. The utility of the platform may be extended to enable environmental and commercial scenarios that would benefit society by accelerating the positive impact of emissions reduction and mitigation efforts.

The data platform is configured to facilitate connecting of project sensors and other data connections to its platform for continuous monitoring of the mitigation activity of emissions such as, pollution. The data platform is configured to measure a multitude of mechanical, chemical, biological, and physical properties of systems. The data platform is configured to perform analysis to verify emissions capture (and transport, storage, and or reuse) systems and subsystem components, including but not limited to quantity, composition, and attributes—validated both as independent factors and collectively as a complete system. The data platform is configured to use AI/ML data science techniques to assess operational anomalies in multivariant systems for emissions capture, sequestration, and/or reuse. The data platform has a ratings engine to analyze the surety of the emissions capture verification analysis and determine a surety rating. The data platform is configured for analysis of operational performance to specification of sub-systems and overall system performance insights into the efficacy and efficiency of emissions capture, sequestration, and/or reuse, which might include the use of digital twins. The data platform may have a ticketing method to capture system performance issues, which might include workflows to manage remediation, and which might include a messaging alert function.

Further, the data platform is configured for management via secure workflow of greenhouse gas emissions and pollution mitigation activity data collection, management, analysis, recording, securitization, and monetization, including registration of an emissions reduction project, including the specific project relevant data. The data platform is configured to facilitate the connection of on-site project operational measurement data feeds, including utilizing a standardized information exchange format. The data platform is configured to facilitate the collection, continuously or intermittently, of on-site project operational measurement data. The data platform is configured to facilitate the management of project operational measurement data, including storing project operational measurement data. The data platform is configured to facilitate the analysis of project operational measurement data, including use of algorithmic computations, artificial intelligence, and machine learning. The data platform is configured to facilitate generating a rating and evaluation details of project operational measurement data, including the incorporation of governmental and non-governmental verification standards, benchmarks, and reference data.

The data platform is further configured to facilitate storage of the analysis, ratings, and evaluation details of project operational measurement data. The data platform is configured to facilitate the generation of uniquely identified records associated with specific quantities of removed, transported, sequestered, and/or reused emissions from the project, including supporting data and analysis associated with the specific quantities. The data platform is configured to facilitate the creation of digital assets, such as carbon credits, representing the uniquely identified records associated with specific quantities of removed, transported, sequestered, and/or reused emissions. The data platform is configured to facilitate the registering of the created digital assets in a registry, including maintaining a registry, connecting to and bi-directionally exchanging digital asset registration data with third-party registries. The data platform is configured to facilitate the offering of the registered digital assets for sale on an exchange, including operating an exchange, connecting to and bi-directionally exchanging digital assets with other exchanges. The data platform is configured to facilitate the creation and maintenance of digital wallets for enabling transactions of the digital assets. The data platform is configured to facilitate the bi-directional data interchange with custodial services for the maintenance of accounts and execution of transactions of the digital assets.

The data platform is configured for verification of emissions mitigation occurring in a physical environment, as opposed to verification of a digital asset. The data platform is configured for analytics that pertain to emissions mitigation systems and sub-systems, as opposed to analytics related to blockchain transactions. The data platform is configured for computing a confidence score of a verification analysis, as opposed to a confidence score of an emissions project claim. The data platform is configured for maintaining a record of non-digital assets in a database, i.e., system performance data. The data platform is configured for maintaining a record of a registry of digital assets representing physical assets, i.e., emissions removed from the environment, as opposed to digital assets representing intangible assets. The data platform is configured for monitoring the performance of emissions mitigation systems and sub-systems, as opposed to monitoring changes in attributes of an emissions project claim.

The data platform is configured for creating a digital asset from the data records generated through the verification analytics process for an emissions mitigation project, as opposed to generating token data from a third-party data source of emissions credits. The data platform is configured for generating emissions credits from verified emissions mitigation activities, as opposed to receiving emissions credits from third-party issuers. The data platform is configured for interfacing with and/or operating a market for generated emissions credits where pricing may be driven by the market. The data platform is configured for maintaining a registry which includes ownership data. The data platform is configured for storing data in a distributed ledger. The data platform is configured to update data records for a multitude of attributes related to the emissions credit over its lifetime, as opposed to only ownership.

The data platform is configured for creating a digital asset from the data records generated through the verification analytics process of an emissions mitigation project utilizing the same platform, as opposed to generating a digital asset from a third-party emissions crediting entity. The data platform is configured for the use of distributed ledger technology to facilitate smart contracts where the smart contracts are linked to data records associated with the verification analytics process of an emissions mitigation project utilizing the same platform, as opposed to generating a digital asset from a third-party emissions crediting entity. The data platform is configured for providing emissions mitigation measurement, reporting, and verification. The data platform is configured for utilizing verified emissions mitigation data to create high-integrity emissions credits.

Extended Utility of Platform

Hyper-scaling the sensor intakes enables massive quantities of devices, machines, vehicles to connect to the platform to provide dMRV services at mass scale. By example, such scenarios might include microgrid scale emissions mitigation activity systems, electric self-driving vehicles, heating stoves, and any other enabled endpoints with sensor technology.

Commercial models enabling: the produced high-integrity emissions credits and their digital records to be associated in a commercial context with specific claims of emissions neutrality of products, services, and other actions of corporations, organizations, and individuals; the purchase, sale, or ownership assignment of emissions credits, in full or fractional units, as may be associated with products, services, and other actions of corporations, organizations, and individuals; and/or the sale of future contracts for emissions credits to be produced to enable capital investment and financing of emissions mitigation projects.

BRIEF DESCRIPTION OF THE DRAWINGS

FIG. 2 depicts a flowchart illustrating a system of the data platform, according to at least some embodiments disclosed herein;

FIG. 4 depicts a flowchart illustrating a dMRV measurement process in direct air capture producing CO2, according to at least some embodiments disclosed herein;

FIG. 7 depicts a flowchart illustrating another embodiment of a dMRV measurement of inputs and outputs in a biochar system, according to at least some embodiments disclosed herein;

DESCRIPTION OF THE PREFERRED EMBODIMENTS

Figure 1:
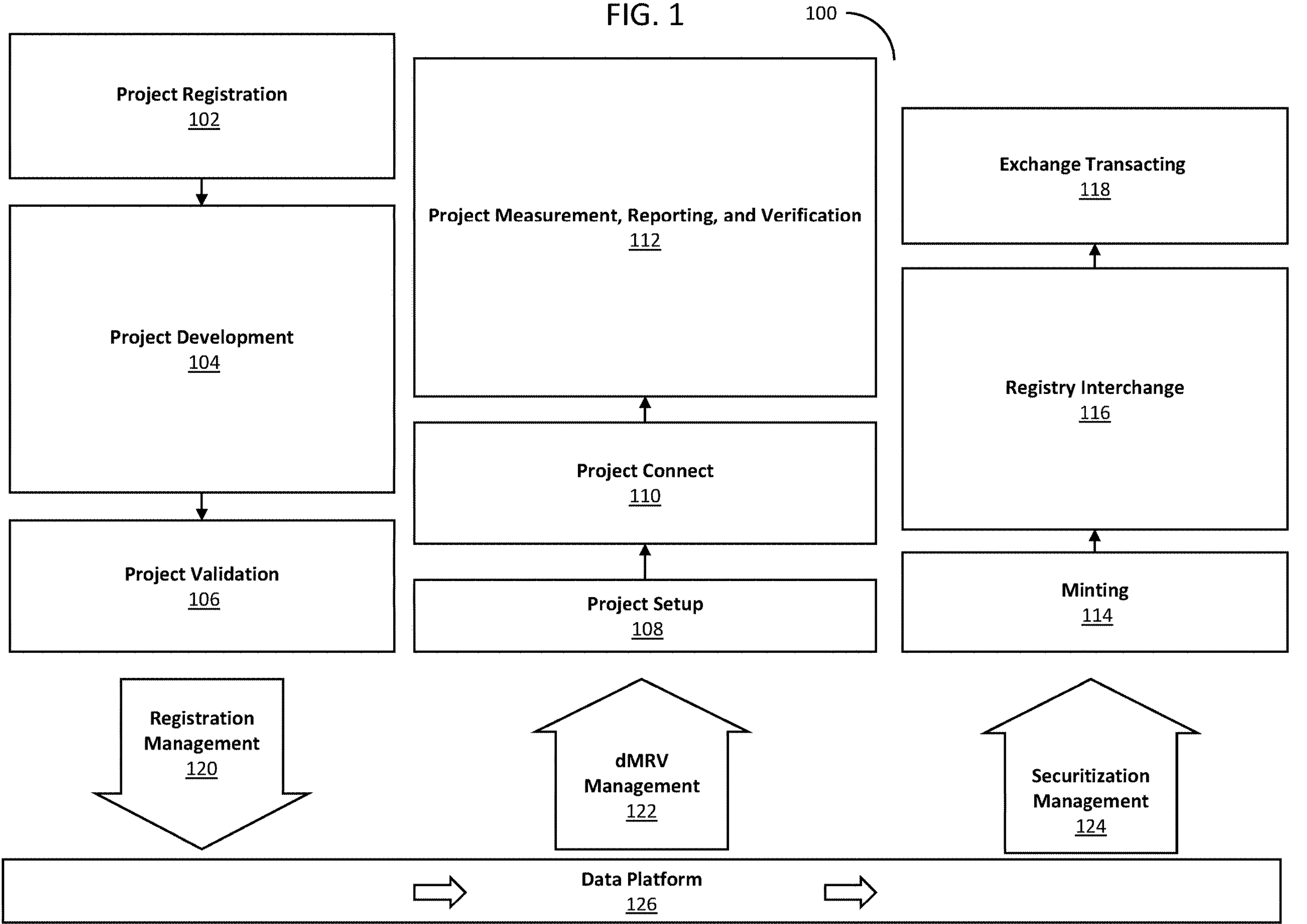
FIG. 1 depicts a flowchart illustrating a computer-implemented method using a data platform for processing an emissions mitigation activity project plan, according to at least some embodiments disclosed herein.

The preferred embodiments of the present invention will now be described with reference to the drawings. Identical elements in the various figures may be identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

As used herein, the singular forms "a," "an," and "the," are intended to include the plural forms as well, unless the context clearly indicates otherwise.

The phrase "and/or," as used herein in the specification and in the claims, should be understood to mean "either or both" of the elements so conjoined, i.e., elements that are conjunctively present in some cases and disjunctively present in other cases. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

FIG. 1 illustrates the process details at step 102, in which project registration is when a project developer registers the project on the platform in order to enable the project to utilize the platform's project development tools and/or to enable the project to utilize the platform for monitoring, verification, and reporting of the project. The project's data record is set up and is associated to the registered identities of the project owner, engineering partner, lifecycle analysis provider, and/or other project participants, where the identities include individual person identities and organizational identities. The registered identities of project participants may also include such information as, but not limited to, KYC and/or AML data. Multiple projects may be associated with any of the project developer, engineering partner, lifecycle analysis partner, and/or other project participant. Project documents are added to the project's record. Relevant project data is captured, stored, and structured for communication via a standardized messaging protocol. Data capture may be executed by any one or combination of automated extraction from documents added to the digital record, manual entry, or data made available by any other connected data source.

The project developer manages their registration 120, of the project on the platform to gain access to the platform's project development tools and/or dMRV services, and/or the securitization services. Projects require this dMRV to provide regulators, certification bodies, and/or auditors with proof of emissions mitigation impact. Some project developers will use the data records to document their own emissions reduction efforts. Other project developers will securitize the emissions mitigation activity and sell the resulting emissions credits to buyers who will offset their own emissions, or potentially investors who will buy them speculatively to trade. The project registration information includes, but is not limited to, project owner details, engineering partner details, lifecycle analysis provider details, project meta information—e.g., location, methodology, capacity, timelines, project plan information, engineering plan information, lifecycle analysis information, and/or banking and financial information.

Currently, there is a technical problem with no single platform existing that holds the complete data of all project participants, relevant project data, and the complete verification analytics data of the project. Thus, there is a need to create transparency for all emissions mitigation project participants, regulators, and relevant parties. The systems and computer-implemented methods described are directed to a technical solution that provides a technical effect, at step 102 of project registration and management to provide a single platform that captures, records, automatically updates, and makes available all data related to an emissions mitigation project including the complete verification analytics data of the project.

Data storage may utilize any database, distributed ledger, or other data storage methodology. Data storage may occur across one or more data stores and methodologies. Standardized messaging protocol may be any one or combination of first party newly defined messaging protocols, third-party newly defined messaging protocols, or pre-existing industry messaging protocols.

FIG. 1 depicts a flowchart illustrating a computer-implemented method 100 using data platform 126 for processing an emissions mitigation activity project plan, according to at least some embodiments disclosed herein. At step 104, project development is when a project developer and/or project development partner create and/or upload an emissions mitigation activity Lifecycle Analysis (LCA), and/or a project plan, and/or an engineering plan for technology-based projects. The LCA is either created using the LCA development tools provided on the platform, or if preexisting, and/or the engineering plan is pre-existing, it is added to the project digital record and their data incorporated for use in dMRV 122. The LCA and/or other project plans are added to the data record. The LCA and/or other project plan data informs the dMRV process regarding the process steps, technology, performance expectations, etc.

The emissions mitigation activity project begins with a project owner developing a project plan that specifies the project's methodology such as Direct Air Capture, Industrial Carbon Capture and Storage, Bio Energy Carbon Capture and Storage, Biochar, Enhanced Rock Weathering, Waste to Energy with Carbon Capture and Storage, and the standard and/or certification entity against which its dMRV is to be evaluated, etc. The project owner typically hires an engineering company specializing in the methodology of emissions mitigation activity or reduction. The engineering company develops an engineering plan defining the technical elements of the solution, its requirements, development plans, and capacity (i.e., quantity of metric tons of carbon dioxide that can be removed from the atmosphere or captured in an industrial process). The project plan and engineering plan inform the project dMRV process of project attributes, which include by example but are not limited to: The expected performance of the project in terms of capacity and outputs (e.g., quantity of stored CO2, reused CO2, and biochar produced); the process steps need to be measured, recorded, and verified; and how the process steps can be measured by identifying the subsystems and the available sensors in the system: the anticipated emissions footprint of the emissions mitigation process itself; and/or other anticipated project specific environmental and/or social benefits or impacts.

Currently, there is a technical problem in which project data is maintained by different parties, in different formats, in various repositories, and is not accessible for dynamic use in analytics. Thus, there is a need to utilize a dynamic data platform for data management to support project development, and/or dMRV, and/or securitization for emissions mitigation projects. The systems and computer-implemented methods described are directed to a technical solution that provides a technical effect, at step 104 of project development to provide a single platform for all data management related to an emissions mitigation project structured in a manner to enable dynamic use in project development, and/or dMRV, and/or securitization.

Referring again to FIG. 1, at step 106, project validation is when the project plan is reviewed by an independent and qualified environmental science validation entity. The output is a project assessment report, also referred to as the Lifecycle Analysis (LCA)—the documentation of the entire process of emissions mitigation activity and sequestration/reuse, affirming compliance with industry standards, established certification methodologies, and/or regulations. e.g., https://www.nrel.gov/analysis/life-cycle-assessment.html. The project plan and/or the engineering plan require an independent project validator to review and certify that the project as scoped is viable in that its design should deliver the purported environmental benefits. The output is a Lifecycle Analysis report (LCA). The LCA typically looks at the end-to-end impact including the energy used in the system and its carbon footprint, the mitigation activity process itself, and the end-of-life step of storage or reuse. The LCA forms a portion of the digital record of the project that is captured in the dMRV. It is also used to inform the dMRV process by affirming or correcting the environmental impact assumptions in the project plan and engineering plan. Project validation concludes with ensuring the veracity, uniqueness, and completeness of project registration.

Referring again to FIG. 1, at step 108, project setup in the data platform occurs. The data platform confirms the completeness of the registration and provides access to the project connect functionality at step 110.

Referring again to FIG. 1, at step 110, project connect is when project sensors and data feeds are connected to the data platform and tested. Project operating data from sensors, meters, images, etc. are collected, structured, and recorded. Project operating reports may be generated. The sensors implemented in the methodology are connected to the data platform by secure APIs. Connection may be any one or combination of direct from sensor to APIs, sensor to edge device, or devices to APIs. or sensor to a third-party server to APIs. Unique identities are created for each sensor, and/or data source, associated with the project. Each sensor identity may be associated with operating specification data relevant to the sub-system it is sensing and may also be associated with historical operating data from the same or associated systems. Relevant third-party data sources may be connected to the project's data records. Third-party data may include, by example but not limited to, satellite imagery data, photogrammetry data, synthetic aperture radar data, terrestrial LiDAR data, terrestrial laser scanning data, allometry data, or other such relevant measurement methodologies. Connections may be tested for security, reliability, availability, scalability, and configurations may be modifiable by either an automated, manual, or AI driven process. Connection attribute data are recorded in the project data record. Operating data on the project's connect attributes is generated by the data platform and added to the data record.

Currently, there is a technical problem in which emissions mitigation systems and activities are measured on-site and rely on human involvement, which has a high cost and constrains growth in projects. Thus, there is a need to have a standard secure connection method and format to enable continuous and/or dynamic monitoring of emissions mitigation systems. The systems and computer-implemented methods described are directed to a technical solution that provides a technical effect, at step 110 of project connect to provide a fully automated secure chain of connectivity to sensors in the emissions mitigation system, removing the need to have humans beings on-site.

Referring again to FIG. 1, at step 112, project measurement, reporting, and verification occurs. Measurement data of project systems operations is collected from sensors and other data sources, transmitted, and recorded in the project data record. All relevant project operating data is processed by a risk engine for the purpose of anomaly detection. All relevant project operating data that has been processed by a risk engine is then further processed by a verification engine for the purpose of determining actual emissions mitigation impact. Analytics data and project attribute data are processed by a rating engine to determine a surety rating of the analysis of the emissions mitigation impact. Records of verified emissions mitigation activity units are immutably recorded, including supporting data records, and are made available for regulatory and other reporting. Measurement of project operating data may be collected in any one or combination of continuous collection, collection when the system is in operating mode, or at any schedule of intervals as may be appropriate. Data collected may be in structured or unstructured form, and as appropriate structured for use in analytics. Data might be encrypted, be protected by access controls, be protected by use controls, and/or otherwise secured. The risk engine operates in an analogous manner to bank fraud detection engines for anomaly detection, the difference being the analytics algorithms, ML, and AI are developed and trained specifically with data related to the emissions mitigation project, project methodology, project sensors, and/or project relevant data sources. The verification engine operates as a combination of technologies including, but not limited to, a digital twin of the emissions mitigation project whose purpose is to provide a process structure for emissions mitigation activities, project data from the LCA and/or engineering plan and/or other project plans to inform the process steps and/or anticipated operating ranges, formulae related to the chemistry, physics, and/or biology of the activities, AI/ML technologies and techniques, and/or various third-party data sources for the purpose of determining the actual emissions mitigation impact of the activity.

The risk engine, verification engine, and/or ratings engine may utilize machine learning techniques, incorporation by reference: Reinforcement Learning: An Introduction, Second edition, Richard S. Sutton and Andrew G. Barto, c 2014, 2015—https://web.stanford.edu/class/psych209/Readings/SuttonBartoIPRLBook2ndEd.pdf?ref=mentorcruise?ref=mentorcruise. The risk engine, verification engine, and/or ratings engine may utilize use artificial intelligence, incorporation by reference: Artificial Intelligence: A Modern Approach, 4th US ed. by Stuart Russell and Peter Norvig—https://aima.cs.berkeley.edu/ and https://en.wikipedia.org/wiki/Artificial_intelligence. A project's verified operating data, analytics data, assurance rating, and/or attribute data, may be recorded in a multitude of forms as may be necessary to enable certain types of accounting, registry, and/or transactional requirements. Such data may be recorded in aggregate form. Such data may be associated with individual units of standard measures of emissions mitigation activity, reduction, or avoidance. For example, the specific data associated with a one metric ton of carbon dioxide removed and stored from a specific project, with specific sub-systems, at a specific time and date interval.

Currently, there is a technical problem in which there are a limited number of emissions mitigation methodology subject matter experts available to perform measurement, reporting, and verification services. This supply shortage drives up costs, reduces data available, impairs data accuracy, and limits the ability to produce high-integrity emissions credits at scale. Further, the need to cover costs incentivizes inflating emissions mitigation impact estimates to support the creation of false emissions credits and leads to the generation of unearned profits. As a result, current methods are expensive and their reliance on subjective human assessment creates errors and incentivizes data falsification. The systems and computer-implemented methods described are directed to a technical solution that provides a technical effect, at step 112 of project measurement, reporting, and verification, the process is configured to provide a fully automated sensor driven measurement of actual systems performance, removing human measurement subjectivity.

Furthermore, there is a technical problem in which there is a reliance on measurement data in the absence of rigorous verification analytics of that measurement data. Project developers, project validators, project verifiers, and/or standards and certification organizations commonly report measurement data that has not been interrogated for fraud as may be the case when using synthetically created data, nor for workflow step accuracy or operating context accuracy as may be the case when intentionally gaming or fraudulently representing project activity. This lack of data integrity impairs the value of claims made against the emissions mitigation activities and limits the ability to produce high-integrity emissions credits acceptable to market participants. Further, the need to finance emissions mitigation projects relies on the highest possible levels of integrity of the claims made against these verification results resulting in an impaired ability to combat climate change. The systems and computer-implemented methods described are directed to a technical solution that provides a technical effect, at step 112 of project verification to provide a rigorous level of data analytics to ensure the veracity and effect of emissions mitigation measurement data.

Currently, there is a technical problem in which standards and certification organizations, regulators, auditors, and/or markets have limited access to or difficult to parse data interchange that is required to confirm purported environmental impact of emissions mitigation project activities. As a result, there is less-than-satisfactory data available from ongoing project operations to prove impact. The systems and computer-implemented methods described are directed to a technical solution that provides a technical effect, at step 112 of project reporting to provide a project record, dynamically accessible by, for example but not limited to, one or more secure APIs, where the data record may be for any interval in a project's operating life, and where the data record may be in any format, for example but not limited to, a span data package.

Currently, there is a technical problem in which a MRV is always conducted with imperfect information. As a result, it is extremely difficult for buyers of emissions mitigation credits to compare the quality of credits across various projects. Additionally, it makes it difficult for buyers and markets to price the emissions credits correctly. The systems and computer-implemented methods described are directed to a technical solution that provides a technical effect, at step 112 of analysis rating to provide via rating engine a fully automated surity rating of the environmental impact analysis to provide to certification registries, regulators, markets, and/or project developers.

Referring again to FIG. 1, data platform 126 performs securitization management processes at step 124. At step 114, minting, verified emissions mitigation activity units are minted into digital emissions credits and are dynamically linked to their supporting data records. The emissions credit creation is referred to as "minting". Emissions credits are immutably recorded, as are their supporting data records. Project data records, including the verifying analytics, and assurance ratings, form the basis upon which high integrity emissions credits are created. Emissions credits may be minted in any form that may be recorded in any ledger. In a preferred embodiment emissions credits may be minted as digital non-fungible tokens (NFTs). The NFTs represent the ownership rights to specific units of verified emissions removed and are dynamically linked to the supporting project data records from the specific emissions mitigation activity unit. The NFTs serve the purpose of enabling smart contracts which reside on a blockchain. Smart contracts enable the automatic execution of transfer of the verified emissions credits, transfer of payment, and proof of ownership of the verified emissions credits. The data records of the verified emissions credits, and/or NFTs, are dynamic and may be added to as new project information becomes available. This information by example may be, but is not limited to, further information emissions removal transportation, storage, reuse, impairment, changes in ownership, and/or retirement of credits for emissions neutrality claims. The verified emissions credits, and/or NFTs, may have their associated data stored in a multitude of methods relevant for data storage, including but not limited to NFT data storage pursuant to the various use cases, use cases related to legal rights, and/or commercial transactions. These methods may include, but are not limited to, any one or combination of distributed ledgers, and/or other database technologies. The data records of the verified emissions credits, and/or NFTs, may have their associated data encrypted, protected by access controls, protected by use controls, and/or otherwise secured.

Currently, there is a technical problem in which emissions credits sold today are mostly of questionable origin and, according to independent reporting on the industry, the vast majority (>90%) of emissions credits have falsified claims of emissions mitigation impact. Thus, there is a need to prove that emissions credits have a link to evidence of actual emissions mitigation impact. The systems and computer-implemented methods described are directed to a technical solution that provides a technical effect, at step 114 of minting to provide emissions credits that are dynamically linked to the data records associated with the specific emissions mitigation impact claimed by the credits.

Currently, there is a technical problem in which emissions credits have incomplete, missing, or inaccessible records of chain of custody. Thus, there is a need to prove current custody and custodial history of emissions credits. The systems and computer-implemented methods described are directed to a technical solution that provides a technical effect, at step 114 to provide evidence digital asset custody by way of project data records of minted emissions credits.

Referring again to FIG. 1, at step 118, the exchange transacting process includes emissions credits being made available for sale, being sold, bought, or otherwise transacted for on any of a first-party exchange and/or a third-party exchange, and/or emissions credits being retired for emissions neutrality claims. Proceeds from emissions credit sales flow to the project developer. Retirements, sales, and/or secondary changes in ownership of emissions credits are recorded in a first-party registry. First-party registry data may be made available to third-party registries to ensure accurate accounting and reporting of emissions credits via data interchange technologies such as, but not limited to, secure APs. Registered credits may be made available for sale to third-parties by any one or more of trading exchanges including, but not limited to, a first-party over-the-counter (OTC) exchange and/or one or more third-party exchanges. Registered credits may be privately sold by the owner. Project owners may retire the credits themselves for their own emissions offset goals. Third-party service providers may provide related financial market services to enable exchange transactions and sales. These may include by example but are not limited to, banking, foreign exchange, custodial, clearing, regulatory reporting, auditing, know-your-customer (KYC), and/or anti-money laundering (AML) services. Transactions may be enabled for any suitable means of payment.

In a preferred embodiment, a digital currency may be used for the purchase and sale of verified emissions credits.

In a preferred embodiment, the digital currency used for the purchase and sale of verified emissions credits may be a stablecoin backed by deposits of fiat currencies.

In a preferred embodiment, the emissions credits may be used as an asset for backing a stablecoin.

In a preferred embodiment, the emissions credits may be used as a digital currency.

The digital currency may be used in conjunction with NFTs and smart contracts.

In a preferred embodiment, users of the data platform may establish custodial accounts and/or digital wallets for transacting the verified emissions credits.

In a preferred embodiment, derivative financial assets may be created from the verified emissions credits, and/or the derivative financial assets may be transacted for on the data platform.

In a preferred embodiment, the data platform may provide settlement services.

Currently, there is a technical problem in which no integrated single chain of verified emissions mitigation impact, credit issuance, and market function of verified emissions credits exists. Profiteering and fraud by dubious project owners, intermediaries, and market participants is rampant. As a result, emissions mitigation projects, credit issuing intermediaries, and markets transact with little of the profits flowing back to the project owner. The systems and computer-implemented methods described are directed to a technical solution that provides a technical effect, at step 118 of exchange transacting to provide a single platform that provides a transparent chain of data that evidences emissions mitigation impact, enables the linked credit issuance, and market interchange and functionality to ensure emissions credit markets function efficiently and effectively.

Referring again to FIG. 1, at step 116, the registry interchange process is described. Initially, the verified emissions credits are registered in the data platform registry to the developer of the emissions mitigation project. Credit registration information is made available to third-party registries to access via data interchange technologies such as, but not limited to, secure APIs. Likewise, the data platform registry may push information to third-party registries. Updates to the data records associated with the registered emissions credits are made available to all connected registries. Updates to data records of registered credits may affect the ratings, value, and other attributes of the verified emissions credits. Registry data associated with verified emissions credits may be stored in one or more data repositories in accordance with methods for storing NFT data, data records in general, and other methods as may be required by regulators. Registry data on the data platform is made available for third-party audit. Registry data might be encrypted, be protected by access controls, be protected by use controls, and/or otherwise secured. Registry data exchange with third-party registries ensures transparency and integrity across markets.

Currently, there is a technical problem in which custody visibility across registries is lacking or does not exist whereby the result is that buyers are defrauded in duplicate sales known as double counting. The systems and computer-implemented methods described are directed to a technical solution that provides a technical effect, at step 116 of registry interchange to provide a bi-direction interchange of auditable registry data for verified emissions credits, where data may include, but is not limited to, emissions mitigation impact, verification analysis data, assurance ratings, ownership history, retirement status, and pricing history.

Currently, there is a technical problem in which no environmental emissions messaging protocol exists that is used to communicate emissions mitigation activity data in a secure, standard manner, that simplifies data exchange. More specifically, there is no single messaging protocol that enables communication of emissions mitigation data in a compatible manner with digital asset creation, and financial market systems, to collectively enable the dynamic affiliation of dMRV data to emissions credits. Thus, there is a need for a standardized messaging protocol that specifically enables the dynamic exchange of environmental emissions data with digital asset creation, and financial market systems. The systems and computer-implemented methods described are directed to a technical solution that provides a technical effect to provide a standard extensible environmental messaging protocol, a markup language, that enables the capture, structuring, transmission, and processing of data dynamically.

FIG. 2 depicts a flowchart illustrating process of system 200 of the data platform. At step 202, client messaging occurs. At step 204, client enrollment occurs. At step 206, edge computing occurs. Connect module 208 has data hub 210, digital twins 212, raw data storage 214, project registration and management portal 216, and/or project registration validation engine 218. Certification module 220 has risk engine 222, cognitive data warehouse 224, data marts 226, EXCGML (Markup Language), 228, rating engine 230, policy and methods portal 232, immutable datastore 234, and/or verification engine 236, and/or reporting engine 237. Exchange module 238 has third party reporting 240, ERP 242, exchange connectivity 244, OTC trading venue 246, and/or digital asset minting 248.

Data hub 210 enables continuous condition-based monitoring of physical assets for CO2 mitigation activity verification. Data hub 210 of connect module 208 is configured to message a client for real-time ingestion of the sensor, telemetry and/or third-party data, enrollment of the client to assign certificates, enable encrypted data communication and edge computing of the client for file transfers and/or aggregation prior to ingestion where network security conventions and/or data volumes may require it. In an embodiment, MQTT, AMQP, Rabbit MQ or other communication protocols to send telemetry, property, and other data from physical devices to the cloud and to issue commands from cloud applications to devices either directly or indirectly. X.509, PGP, RSA, or other certificate and private/public key exchange for enrollment of entities, users, devices, and data sources. Raspberry PI, Windows embedded, or similar OS lite devices deployed as edge devices where required.

Digital twins 212 enables simulation of carbon mitigation activity projects prior to their implementation, seamless integration between the physical and the digital world, forecasting, and testing of changes to processes, methods, and/or policies. Digital twins 212 of connect module 208 is configured for graphical representation and/or visualization of physical objects, relationships between them, and attachment of both real and/or simulated telemetry data, properties, and/or environmental factors. In an embodiment, a device may be modelled using DTDL or similar JSON-LD based description language enhanced to enable complex scenario simulation, dependencies, and hierarchies with automated graphical representation of specific carbon mitigation activity, re-use and storage scenarios with a searchable and usable library of pre-modelled physical world environments, devices, groups of devices, and processes.

Raw data storage 214 stores structured and unstructured data in its native format ingested from multiple sources including, but not limited to, data ingested by the data hub e.g. HID and PLC systems, SCADA systems, sensors, edge devices, laboratory instruments, and other third party data sources such as files, external database queries, websites, manual inputs, physical documents, images, audio, providing flexibility and abstraction from business logic, model development, and analysis while enabling back testing, distribution to third party systems and full auditability of derived data usage in other elements of the system. Raw data storage 214 is searchable with integrated common functions for data classification, aggregation, and simple visualization. It is within the scope of this invention for raw data storage 214 to have automated archiving and dynamic switching between hot and cold storage media. In an embodiment, the raw data storage may have data lake leveraging NO SQL Technology, an elastic search, and/or both common and/or proprietary data science libraries.

Project registration and management portal 216 supports the project initiation process in the context of the clean development mechanism and other international, local, and/or individual initiatives related to mitigating climate change. It is within the scope of this invention for project registration and management portal 216 to have a registry of registries to enable inter registry transfers and to facilitate inter and intra registry reconciliation in order guarantee uniqueness of project registrations thereby mitigating double counting. Project registration and management portal 216 may be designed specifically for Life-Cycle Analysis (LCA) data capture and processing. Project registration and management portal 216 is configured for digital workflow configuration, execution, and reporting facilitating handoff between the different market participants, with electronic document ingestion, classification, and/or digitization. In an embodiment, project registration and management portal 216 may use cloud-based automation and/or orchestration tools for workflow implementation, automated data model driven GUT generation for manual data entry, and AI augmentation such as, OCR and NLP for digitization of physical documents and unstructured communications such as email, chat, or voice communications.

Project registration validation engine 218 ensures the veracity, uniqueness, and completeness of project registration. Project registration validation engine 218 is configured for assessment of project claims against similar pre-existing projects and benchmarks. KYC, AML, and sanctions verification and compliance. In an embodiment, project registration validation engine is configured for reconciliation of LCA projections and forecasts against other projects and reconciliation of project meta data against public databases, commercial registers, land and property registries, news and social media feeds related to associated entities and UBO's with manual controls prior to full validation and/or onboarding.

Certification module 220 has a risk engine 222 detects potential fraud by identifying anomalies in data patterns, device behavior, and/or user behavior. Risk engine 222 is configured for raw data processing, analytics, forecasting, model training, testing, and/or explanation. In an embodiment, risk engine 222 may use a combination of supervised and unsupervised machine learning and artificial intelligence techniques applied to raw data.

Certification module 220 has a cognitive data warehouse 224 configured to decode, classify, and ingest raw data into logical schemas and/or datastores for use in applications. Certification module 220 is configured to extract, transform, and load. It is within the scope of this invention for certification module 220 to automate database schema creation. It is within the scope of this invention for certification module 220 to clean and normalize data.

Certification module 220 has data marts 226 configured to enable business intelligence, analytics, and/or client-facing data visualizations. It is within the scope of this invention for data marts 226 to have a domain specific data mart with automated performance tuning, built in visual and/or SQL query tooling, native integration with data visualization tools. In an embodiment, data mart 226 has a multi-dimensional star-schema database.

Certification module 220 has EXCGML 228 configured to enable interoperable representation of carbon mitigation activity projects, operations, transactions, and/or carbon credit life cycle events and processes such as, inter-registry transactions, confirmations, and/or regulatory reporting. It is within the scope of this invention for EXCGML 228 to be technology agnostic, extensible, and/or community driven. In an embodiment, EXCGML 228 may be an XML based markup language. It is within the scope of this invention that alternate markup languages may be used to facilitate the interoperable representation of carbon mitigation activity projects, operations, transactions, and/or carbon credit life cycle events and processes such as, inter-registry transactions, confirmations, and/or regulatory reporting.

Certification module 220 has rating engine 230 configured to determine and assign a confidence level in the integrity, accuracy, and/or completeness of the emissions mitigation data. It is within the scope of this invention for rating engine 230 to be configured for model trust, risk and/or security management. It is also within the scope of this invention for rating engine 230 to be configured for transparent and/or auditable use of models, with detailed explanations of decisions made, and robust model governance and life cycle management. In an embodiment, rating engine 230 is configured for using a combination of semi-supervised, supervised, chemistry aware, physics aware, biology aware, and/or "policy and methods" aware machine learning techniques.

Certification module 220 has policy and methods portal 232 to maintain accurate policies, processes, methods, and international standards related to climate mitigation activity projects and carbon removal and to provide inputs and rules for supervised machine learning techniques applied in rating engine 230. It is within the scope of this invention for policy and methods portal 232 to be configured for electronic document management, policy, and methods life cycle information and/or machine-readable rules/logic engine. In an embodiment, policy and methods portal 232 is configured for using cloud-based automation and orchestration tools to translate and extract relevant content from policy documents, chemistry, biology, and/or physical laws.

Certification module 220 has immutable datastore 234 configured to provide a secure and permanent history of all actions on the platform and as such for all carbon mitigation activity claims, ratings, and/or risk events. It is within the scope of this invention for immutable datastore 234 to append only ledger tables with georedundancy and/or automated digest management. In an embodiment, immutable datastore 234 is configured for using private, public and/or hybrid distributed ledger technology based on Oracle and/or SQL ledger tables, Tendermint, or another blockchain that is not exposed to speculation and/or volatility related to its native token.

Certification module 220 has verification engine 236 configured to provide multi-layered verification analytics. It is within the scope of this invention for verification engine 236 to utilize artificial intelligence, machine learning, chemistry-based formulae and/or rules, physics-based formulae and/or rules, biology-based formulae and/or rules, modelling tools such as reactive transport models, and combinations of first-party analytics tools and/or third-party analytics tools such as, but not limited to, remote laboratory linked analytics, to determine the actual emissions mitigation results from an emissions mitigation activity.

In some embodiment, modeling tools encompass a variety of software applications used to simulate and analyze complex systems or phenomena. For instance, computational fluid dynamics (CFD) software is utilized to model fluid flow and heat transfer in engineering and environmental studies. Geographic information systems (GIS) software enables the creation and analysis of spatial data for urban planning, natural resource management, and epidemiology. Additionally, finite element analysis (FEA) software is employed to simulate structural behavior and stress distribution in mechanical engineering and civil engineering projects. Furthermore, agent-based modeling (ABM) software allows researchers to simulate the behavior of individual agents within a system to study emergent phenomena in social sciences, economics, and biology. These examples illustrate the diverse applications of modeling tools across various fields.

As noted, in at least one embodiment the multi-layered verification analytics involves employing multiple methods and technologies to thoroughly verify data or certifications. For instance, in the context of cybersecurity, this could entail using a combination of signature-based detection, anomaly detection, and behavior analysis to identify and mitigate threats. In the field of medical diagnostics, multi-layered verification might involve cross-referencing patient symptoms with medical history, laboratory test results, and imaging scans to arrive at a comprehensive diagnosis. Similarly, in financial compliance, verification analytics could encompass transaction monitoring, regulatory compliance checks, and risk scoring to ensure adherence to legal and ethical standards. These examples demonstrate how combining various verification methods can provide a more robust and reliable verification process across different domains.

In implementations, verification analytics technology and methods encompass a wide array of tools and techniques utilized to ensure the accuracy and reliability of data, certifications, or claims. For instance, in the field of environmental certifications, satellite imagery and remote sensing can be employed to verify land use changes or deforestation rates. In financial auditing, algorithms and data analytics are used to detect anomalies or irregularities in financial transactions. Similarly, blockchain technology provides a decentralized and tamper-proof ledger system, enhancing transparency and traceability in supply chains or digital transactions. Additionally, advanced statistical analysis and machine learning algorithms enable the identification of patterns or trends within large datasets, aiding in fraud detection or risk assessment. Overall, verification analytics technology continues to evolve, leveraging innovative approaches to enhance trust and integrity across various domains.

In an embodiment, verification engine 236 is configured for using data from, by example, but not limited to, sensors, meters, machine operating data, digital imagery, satellite, and/or LiDAR. In an embodiment, verification engine 236 is configured to analyze span data packages. In an embodiment, verification engine 236 is configured to dynamically use combinations of data sources. In an embodiment, verification engine 236 is configured for testing analytical models, statistically evaluating the accuracy of models for specific emissions mitigation methodologies, adjusting models based upon real-world data, and/or creating new models. In an embodiment, verification engine 236 is configured for employing intelligent agents [reference: Intelligent agents: theory and practice, Published online by Cambridge University Press, 7 Jul. 2009, Michael Wooldridge and Nicholas R. Jennings https://www.cambridge.org/core/ journals/knowledge-engineering-review/article/abs/intelligent-agents-theory-and-practice/CF2A6AAEEA1DBD486EF019F6217F1597] to find additional sources of data, additional scientific formulae, additional information on emissions mitigation methodologies, additional analytics tools, and/or to run model simulations to improve the assurance level of the verification analysis.

Certification module 220 has a reporting engine 237 configured to provide reports, dashboards, visualizations, insights, decision support, and/or to trigger automated processes. It is within the scope of this invention for reporting engine 237 to be configured for self-service, to be intuitive, and having a modular with a managed content library. In an embodiment, reporting engine 237 is configured for using widely adopted enterprise business intelligence tools such as, Power BI, Tableau, and/or Qlik. It is within the scope of this invention for certification module 220 to be configured to train AI models on MRV data. It is within the scope of this invention for certification module 220 to be configured to use AI trained on MRV data to solve for approaches for conducting improved MRV for current CDR methodologies, and/or for conducting MRV for future CDR methodologies, and/or to innovate new methodologies of CDR.

Exchange module 238 has third party reporting 240 configured to automate third party reporting to investors, regulators, and/or decision makers. It is within the scope of this invention for third party reporting 240 to have a library of preconfigured and self-service reports related to trading and transfer activity which can be scheduled and/or distributed automatically. In an embodiment, third party reporting 240 is configured for using paginated reporting technology and/or managed file transfer.

Exchange module 238 has EMP 242 configured to feed emissions mitigation data to accounting platforms for carbon accounting, statutory reporting, and/or regulatory reporting. It is within the scope of this invention for ERP 242 to be configured to set and forget data translation between EXCGML and common ERP systems and ESG reporting platforms. In an embodiment, ERP 242 is configured to have a managed file and/or message transfer to a common accounting format e.g., SAPPI.

Exchange module 238 has exchange connectivity 244 configured to provide carbon credit producers with access to liquid electronic markets. It is within the scope of this invention for exchange connectivity 244 to have bi-directional broker connectivity, exchange connectivity, price feeds, and/or transaction data. In an embodiment, exchange connectivity 244 is configured to be an implementation of FIX protocol.

Exchange module 238 has OTC trading venue 246 configured to provide a platform for carbon credit buyers and sellers to match and execute transactions. It is within the scope of this invention for OTC trading venue 246 to have P2P trading. In an embodiment, OTC trading venue 246 leverages marketplace/web shop technology.

Exchange module 238 has digital asset minting 248 configured to produce unique high-integrity non-fungible tokens representing 1 metric ton of carbon dioxide removed. It is within the scope of this invention for digital asset minting 248 to be linked to live metadata related to the rating of the project and the data used to generate the token itself with auto burn functionality should the integrity of the project be called into question and supported by a mechanism of locked fiat currency against stablecoin to ensure stable on ramping. In an embodiment, digital asset minting 248 is configured to use proprietary smart contracts deployed in the immutable datastore which may or may not interface to private, public or hybrid blockchains.

Exchange module 238 has registry 250 configured to provide a discoverable repository of verified emissions credits records from an emissions mitigation project. It is in the scope of this invention for registry 250 to be configured to make the registered credit information available to third-party registries. In an embodiment, registry 250 may push information to third-party registries. In an embodiment, registry 250 may enable data updates to the registered credits to be made available to all connected registries. In an embodiment, registry 250 may store data in one or more data repositories in accordance with methods for storing NFT data, data records in general, and other methods as may be required by regulators. In an embodiment, registry 250 may be encrypted, be protected by access controls, be protected by use controls, and/or otherwise secured.

Figure 3:
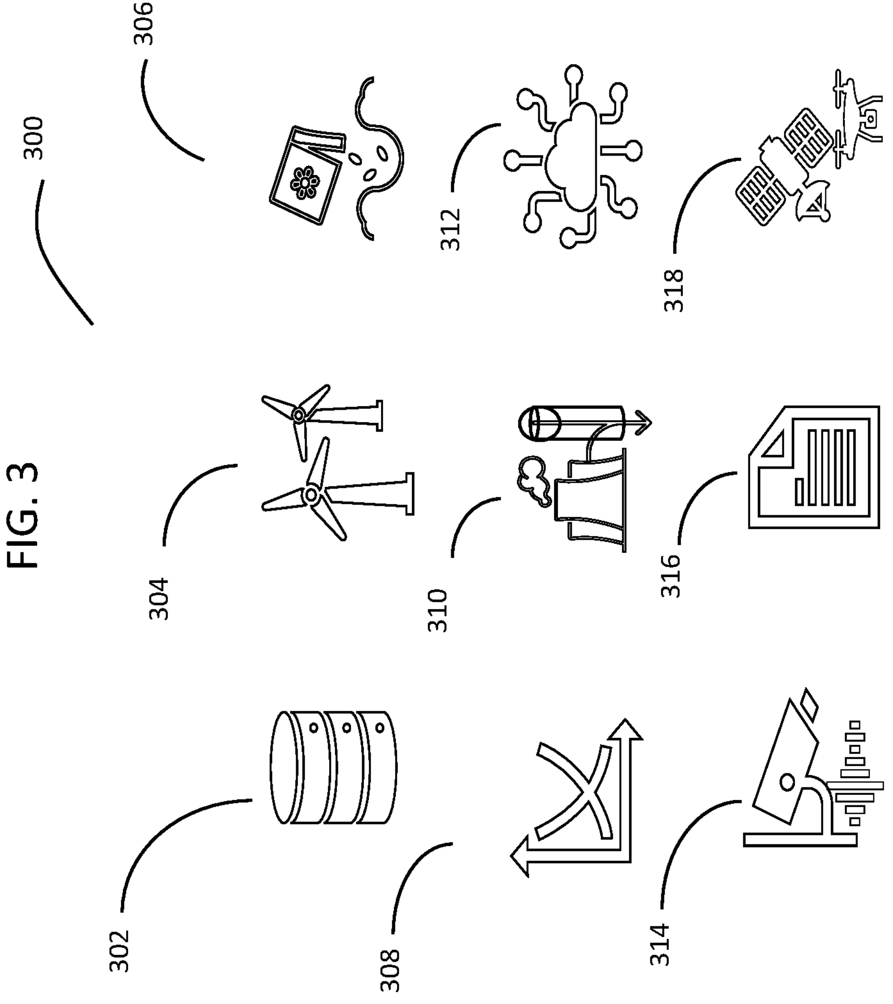
FIG. 3 depicts an illustration of data sources, according to at least some embodiments disclosed herein.

FIG. 3 depicts an illustration of plurality of data sources 300. It is within the scope of this invention for a data source to include, but not be limited to, external databases 302. It is within the scope of this invention for an external database to include, but not be limited to, a registry, a data vendor, an aggregator, and/or an open dataset. A data source may include, renewable asset data 304 such as, wind, solar, a battery, and/or hydrogen. It is within the scope of this invention for a data source to include, but not be limited to, biological data 306. It is within the scope of this invention for biological data to include, but not be limited to, soil, feedstock, and/or biochar sampling. It is within the scope of this invention for a data source to include, but not be limited to: at 308, financial and/or economic data; at 310, emissions data emissions capture, re-use, and sequestration data; at 312, internet-of-things (IOT), sensor, and conditioning measurement data; at 314, multimedia data; at 316, documents, contracts, policies, permits; and at 318, satellite, unmanned aerial vehicle (UAV), and field robotics data.

FIG. 4 depicts flowchart illustrating dMRV measurement process 400 in direct air capture producing CO2. Air intake 402 is in communication via sensor 426. It is within the scope of this invention for a plurality of differing sensors to exist and being illustrated as 426 within FIGS. 4-9. CO2 filtering 404 is in communication via a sensor. CO2 separation 406 is in communication via a sensor. CO2 output measurement 414 is in communication via a sensor. Transport 424 is in communication via a sensor. Storage 410 is in communication via a sensor. Storage 410 is in communication via a sensor. Reuse 412 is in communication via a sensor. Sensor data 416 is in communication with project specific data transport 418. At step 420, messaging client occurs. At step 422, edge device transmits a message to client. Air 408 is output from CO2 filtering 404.

Figure 5:
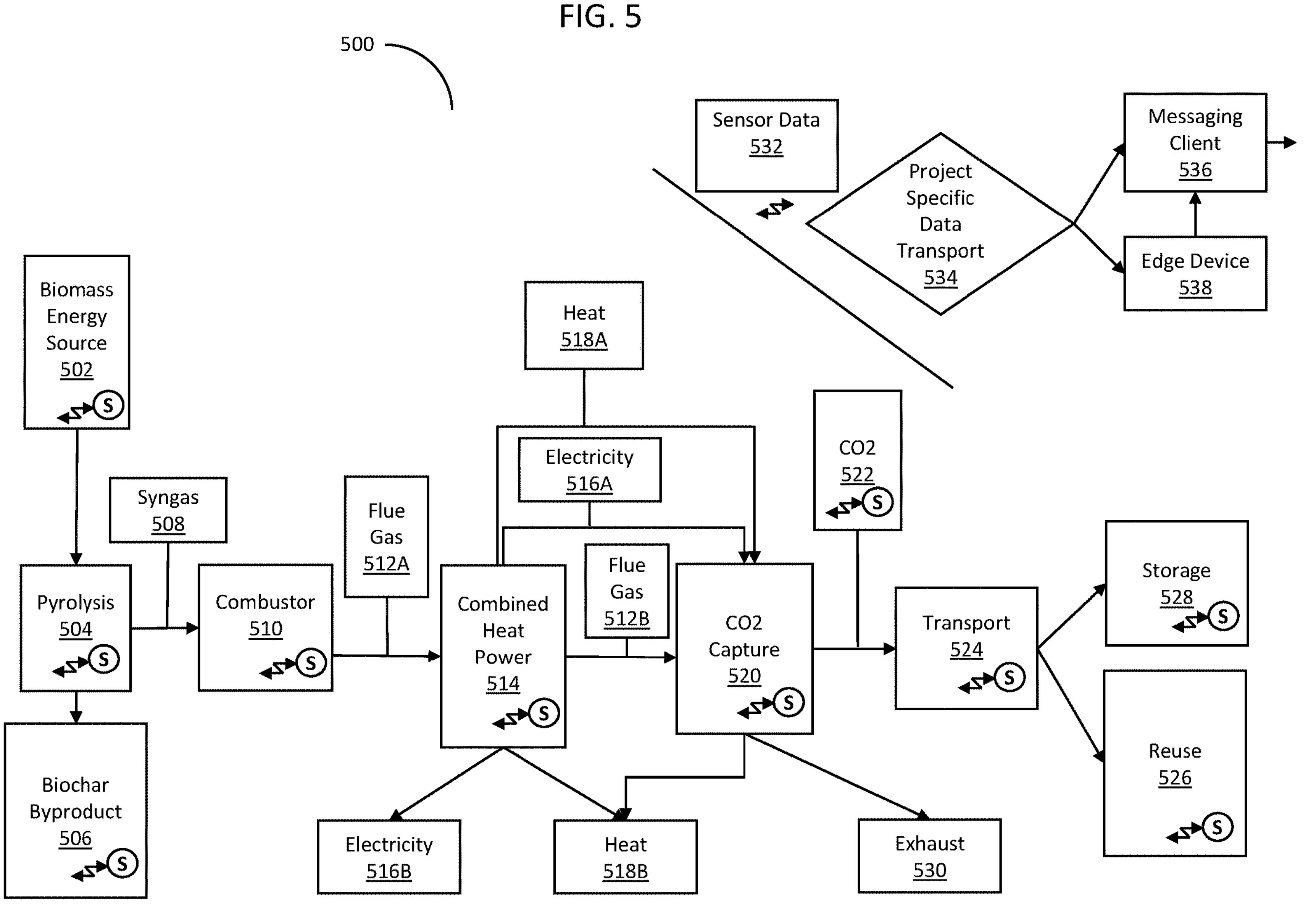
FIG. 5 depicts a flowchart illustrating another embodiment of a dMRV measurement process in bioenergy carbon capture and storage with combined heating and power system producing biochar and CO2, according to at least some embodiments disclosed herein.

FIG. 5 depicts dMRV measurement process 500 in bioenergy carbon capture and storage with combined heating and power system producing biochar and CO2. Biomass energy source 502 is in communication via a sensor. Pyrolysis 504 is in communication via a sensor. Biochar byproduct measurement 506 is in communication via a sensor. Syngas 508 is output from pyrolysis 504 and input into combustor 510. Combustor 510 is in communication via a sensor. Flu gas 512A is output from combustor 510 and input into combined heat power 514. Combined heat power 514 is in communication via a sensor. Combined heat power 514 outputs electricity 516B and heat 518B. Flue gas 512B is output from combined heat power 514. Flue gas 512B is input into CO2 capture 520. Heat 518B and exhaust 530 are output from CO2 capture 520. Electricity 516A and heat 518A are output from combined heat power 514 and input into CO2 capture 520. CO2 capture 520 is in communication via a sensor. CO2 522 is in communication via a sensor. CO2 522 is output from CO2 capture 520. CO2 522 is input into transport 524. Transport 524 is in communication via a sensor. Storage 528 is in communication via a sensor. Reuse 526 is in communication via a sensor. Sensor data 532 is in communication with project specific data transport 534. Edge device 538 transmits a message to a client. At step 536, messaging client occurs.

Figure 6:
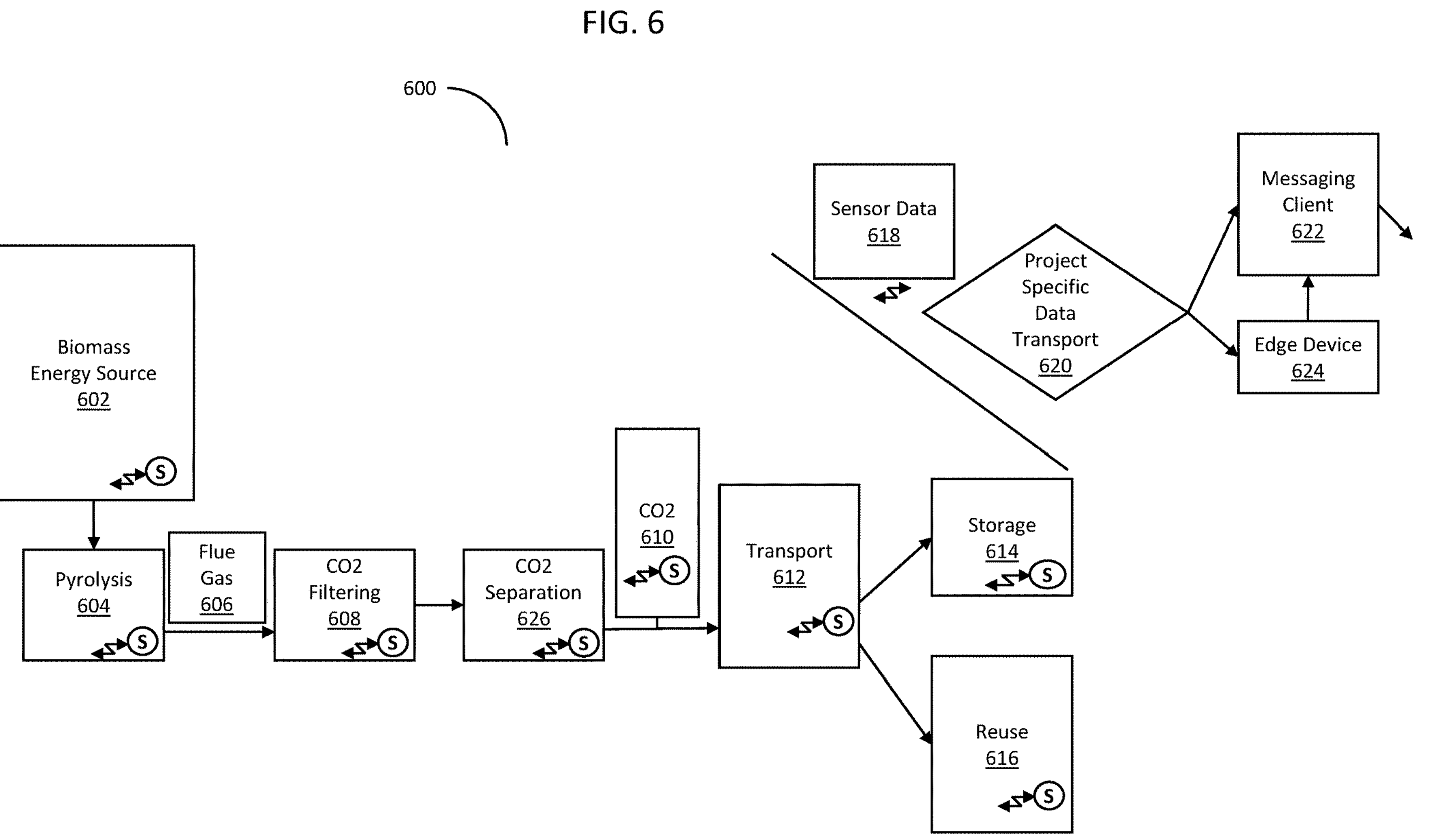
FIG. 6 depicts a flowchart illustrating another embodiment of a dMRV measurement in bio energy carbon capture and storage (BECSS) system, according to at least some embodiments disclosed herein.

FIG. 6 depicts a flowchart illustrating another embodiment 600 of a dMRV measurement in bio energy carbon capture and storage (BECSS) system. Biomass energy source 602 is in communication via a sensor. Pyrolysis 604 is in communication via a sensor. Flue gas 606 is output from pyrolysis 604. Flue gas 606 is input into CO2 filtering 608. CO2 filtering 608 is in communication via a sensor. CO2 separation 626 is in communication via a sensor. CO2 610 is in communication via a sensor. CO2 measurement 610 is in communication via a sensor as output from CO2 separation 626. CO2 measurement 610 is input into transport 612. Transport 612 is in communication via a sensor. Storage 614 is in communication via a sensor. Reuse 616 is in communication via a sensor. Sensor data 618 is in communication with project specific data transport 620. Edge device 624 transmits a message to a client. At step 622, messaging client occurs, FIG. 7 depicts a flowchart illustrating another embodiment 700 of a dMRV measurement of inputs and outputs in a biochar system. Biomass energy source measurement 702 is in communication via a sensor. Pyrolysis 704 is in communication via a sensor. Gas measurement 706 as an output is in communication via a sensor. Biochar measurement 708 is in communication via a sensor. Biochar measurement 708 is output from pyrolysis 704. Biochar measurement 708 is input into transport 710. Transport 710 is in communication via a sensor. Storage 712 by use is in communication via a sensor. Sensor data 714 is in communication with project specific data transport 716. Edge device 720 transmits a message to a client. At step 718, messaging client occurs.

Figure 8:
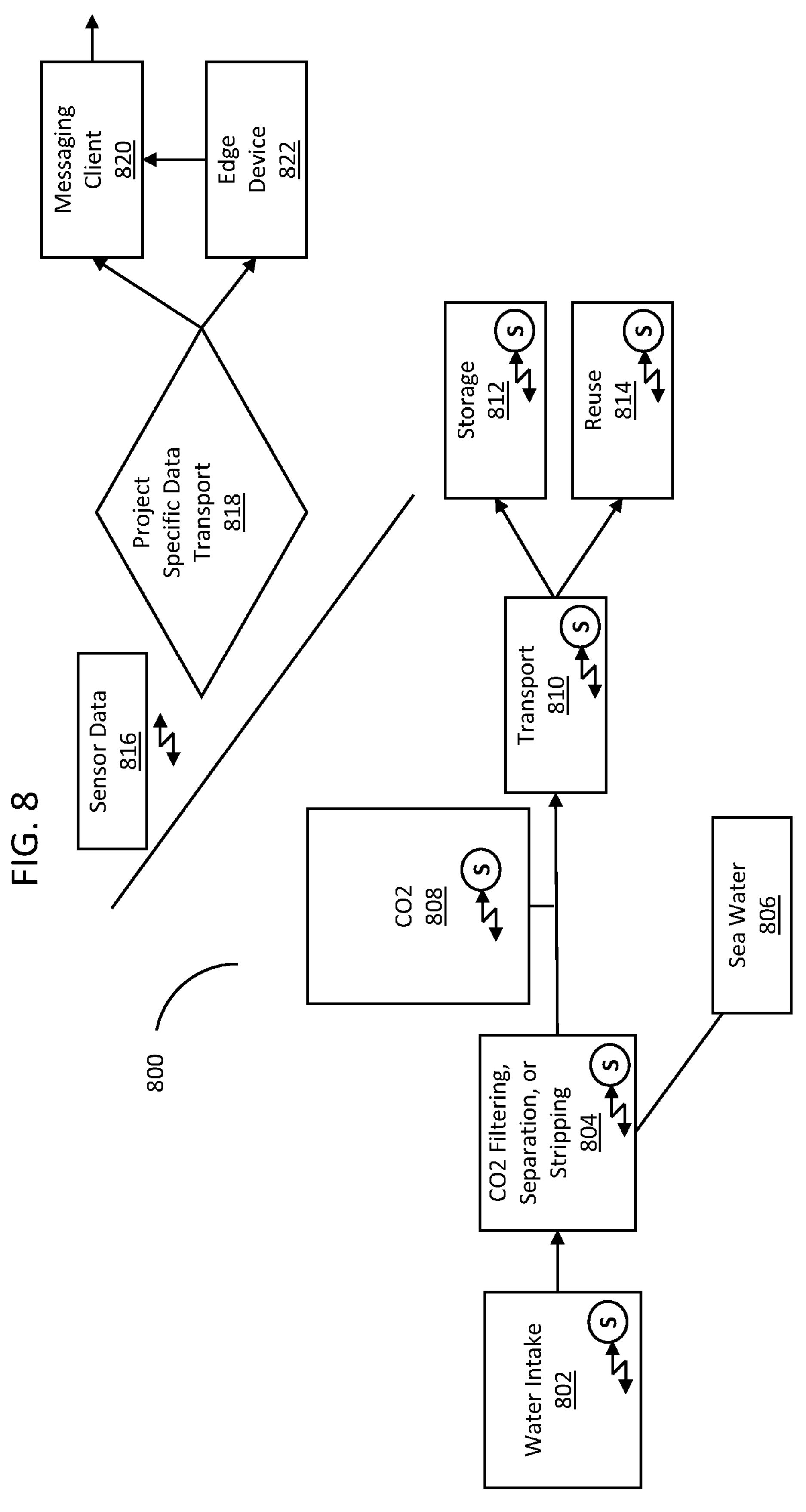
FIG. 8 depicts a flowchart illustrating another embodiment of a dMRV measurement in direct sea capture producing CO2, according to at least some embodiments disclosed herein.

FIG. 8 depicts a flowchart illustrating another embodiment 800 of a dMRV measurement in direct sea capture producing CO2. Water intake 802 is in communication via a sensor. At step 804, CO2 filtering, separation, and/or stripping occur. Step 804 is in communication via a sensor. Sea water measurement 806 is associated with step 804. CO2 measurement 808 is in communication via a sensor. CO2 808 is output from step 804. CO2 808 is input into transport 810. Transport 810 is in communication via a sensor. Storage 812 is in communication via a sensor. Reuse 814 is in communication via a sensor. Sensor data 816 is in communication with project specific data transport 818. Edge device 822 transmits a message to a client. At step 820, messaging client occurs.

Figure 9:
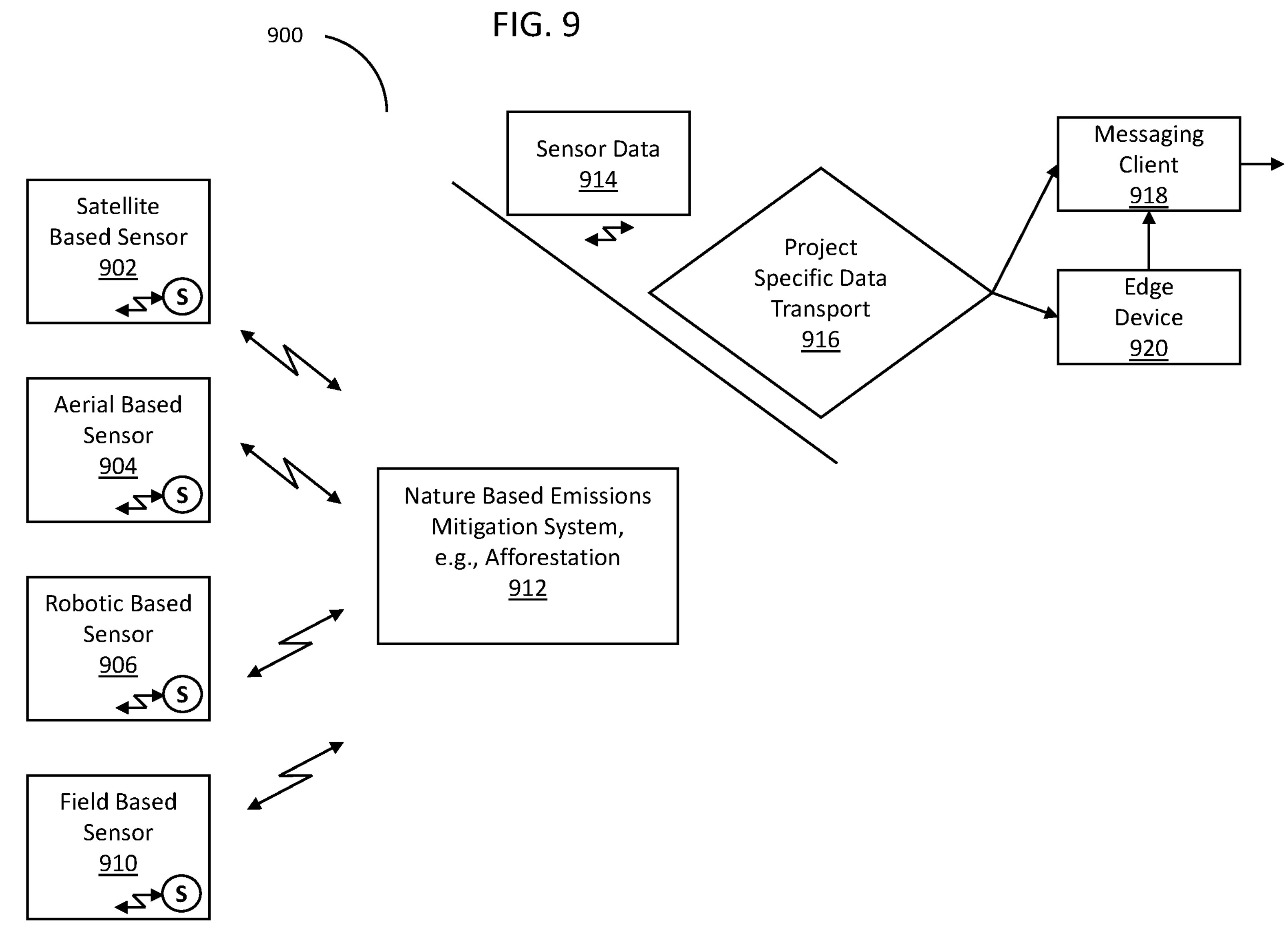
FIG. 9 depicts a flowchart illustrating another embodiment of a dMRV measurement in afforestation capturing CO2, according to at least some embodiments disclosed herein.

FIG. 9 depicts a flowchart illustrating another embodiment 900 of a dMRV measurement in afforestation capturing CO2. The embodiment includes at least one of satellite 902, aerial 904, robotic 906, and/or field-based sensor. Where, at least one satellite 902-based sensor is in communication via a sensor. At least one aerial based sensor 904 is in communication via a sensor. At least one robotic based sensor 906 is in communication via a sensor. At least one field-based sensor 910 is in communication via a sensor. At least one sensor is in communication with nature-based emissions mitigation system 912. It is within the scope of this invention for nature-based emissions mitigation system to include, but not be limited to, afforestation. Sensor data 914 is in communication with project specific data transport 916. Edge device 920 transmits a message to a client. At step 918, messaging client occurs.

It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The descriptions of the various embodiments of the present invention apply in scope and spirit to the other types of CDR methodologies employed today, and which may be employed in the future. The terminology used herein was chosen to best explain the principles of the embodiments, the practical application or technical improvement over technologies found in the marketplace, or to enable others of ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system, comprising:

a data platform implemented on one or more computing devices comprising at least one processor and at least one non-transitory data storage medium storing instructions executable by the at least one processor, the data platform configured to enable and connect digital measurement, reporting, and verification (dMRV) and emissions credit securitization to produce high-integrity environmental emissions mitigation credits;

wherein the data platform having a connect module comprising:

a data hub, the data hub is configured to monitor at least one physical asset for emissions mitigation verification by messaging a client for ingestion of sensor, telemetry, and third-party data via encrypted data communication using certificate and private/public key exchange and edge computing for aggregation prior to ingestion, thereby enabling continuous condition-based monitoring of the at least one physical asset;

digital twins, the digital twins are configured to simulate at least one emissions mitigation project prior to an implementation of the at least one emissions mitigation project;

a raw data store, the raw data store is configured to store raw data from at least one source in a native format enabling auditability of derived data usage; and wherein the data platform having a certification module comprising:

a cognitive data warehouse configured to convert the raw data into a logical schema having at least a portion of operating performance data;

a risk engine configured to detect at least one anomaly using supervised and unsupervised machine learning applied to the raw data;

a rating engine, the rating engine configured to determine a confidence level of the operating performance data and producing a surety rating;

an immutable datastore, the immutable datastore is configured to append a ledger table with georedundancy and automated digest management using private, public, or hybrid distributed ledger technology; and a verification analytics engine, the verification analytics engine is configured to determine one or more emissions mitigation results from an emissions mitigation activity using artificial intelligence, machine learning, and at least one of chemistry-based, physics-based, or biology-based formulae to provide multi-layered verification analytics;

wherein the data platform further comprises:

a markup language configured to enable interoperable representation and dynamic exchange of emissions mitigation data with digital asset creation and financial market systems;

verified emissions credits minted into digital emissions credits, each verified emissions credit comprising:

a digital non-fungible token representing ownership rights to specific units of verified emissions removed, the digital non-fungible token being immutably recorded in the immutable datastore and dynamically linked to supporting project data records including the surety rating and verification analytics;

wherein the data platform having an exchange module comprising:

an exchange connectivity element configured to enable sale, purchase, transfer, retirement, and secondary changes in ownership of the verified emissions credits; and a digital asset minting element, the digital asset minting element is configured to produce the digital non-fungible token using one or more smart contracts enabling automatic execution of transfer of the verified emissions credits, transfer of payment, and proof of ownership;

wherein the data platform provides a unified and transparent chain of emissions mitigation impact data linking sensor-based measurement, verification analytics, digital credit issuance, registry interchange, and market exchange functionality.

2. The system of claim 1 further comprising a project registration and management portal.

3. The system of claim 1 further comprising a project validation engine.

4. The system of claim 1 further comprising a policy and methods portal.

5. The system of claim 1 further comprising an enterprise resource planning ERP data interchange element.

6. The system of claim 1 further comprising a third-party financial systems data interchange element.

7. The system of claim 1 further comprising a third-party reporting element.

8. A system, comprising:

a digital measurement, reporting, and verification (dMRV) and emissions credit securitization data platform implemented on one or more computing devices comprising at least one processor and at least one non-transitory data storage medium storing instructions executable by the at least one processor, the data platform having a connect module comprising:

a data hub to monitor at least one physical asset for emissions mitigation verification by messaging a client for ingestion of sensor, telemetry, and third-party data via encrypted data communication using certificate and private/public key exchange and edge computing for aggregation prior to ingestion, thereby enabling continuous condition-based monitoring of the at least one physical asset;

digital twins to simulate at least one emissions mitigation project;

a raw data store to store raw data from at least one source in a native format enabling auditability of derived data usage; and wherein the data platform having a certification module comprising:

a cognitive data warehouse to convert the raw data into a logical schema;

a risk engine to detect at least one anomaly;

an immutable datastore to append a ledger table with georedundancy and automated digest management using private, public, or hybrid distributed ledger technology; and a verification analytics engine to trigger an automated process to determine actual emissions mitigation results from an emissions mitigation activity;

wherein the data platform further comprises verified emissions credits minted into digital emissions credits, each verified emissions credit comprising a digital non-fungible token representing ownership rights to specific units of verified emissions removed, the digital non-fungible token being immutably recorded and dynamically linked to supporting project data records of the at least one emissions mitigation project;

wherein the data platform having an exchange module comprising:

an exchange connectivity element to enable sale, purchase, transfer, retirement, and secondary changes in ownership of the verified emissions credits; and a digital asset minting element to produce the non-fungible token using proprietary smart contracts enabling automatic execution of transfer of the verified emissions credits, transfer of payment, and proof of ownership.

9. The system of claim 8 further comprising a rating engine to determine a confidence level from operating performance data and to produce a surety rating.

10. The system of claim 8 wherein the immutable datastore to append a ledger table with automated digest management.

11. The system of claim 8 wherein the logical schema having at least a portion of operating performance data.

12. The system of claim 8 further comprising a project validation engine.

13. The system of claim 8 further comprising a policy and methods portal.

14. The system of claim 8 further comprising an enterprise resource planning (ERP) data interchange element.

15. The system of claim 8 further comprising a third-party financial systems data interchange element.

16. The system of claim 8 further comprising a third-party reporting element.

* * * * *